US007981947B2

(12) United States Patent
Yatake

(10) Patent No.: US 7,981,947 B2
(45) Date of Patent: Jul. 19, 2011

(54) AQUEOUS INK COMPOSITION AND METHOD OF MANUFACTURING THE SAME

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 963 days.

(21) Appl. No.: 11/906,119

(22) Filed: Sep. 28, 2007

(65) Prior Publication Data
US 2008/0146729 A1    Jun. 19, 2008

Related U.S. Application Data

(63) Continuation of application No. 10/819,096, filed on Apr. 6, 2004, now Pat. No. 7,294,659.

(30) Foreign Application Priority Data

| Apr. 7, 2003 | (JP) | 2003-103473 |
| Jun. 18, 2003 | (JP) | 2003-173345 |
| Oct. 20, 2003 | (JP) | 2003-359294 |
| Jan. 30, 2004 | (JP) | 2004-023934 |
| Feb. 13, 2004 | (JP) | 2004-036268 |
| Feb. 24, 2004 | (JP) | 2004-048025 |
| Apr. 5, 2004 | (JP) | 2004-111115 |

(51) Int. Cl.
*C09D 11/10* (2006.01)
(52) U.S. Cl. ........ 523/160; 524/556; 524/560; 347/100; 347/107; 106/31.6
(58) Field of Classification Search .................. 523/160; 106/31.6; 524/556
See application file for complete search history.

(56) References Cited

U.S. PATENT DOCUMENTS

| 4,165,333 | A |   | 8/1979 | Kline |       |
| 5,085,698 | A |   | 2/1992 | Ma et al. |   |
| 5,616,364 | A |   | 4/1997 | Cleary et al. | |
| 5,880,758 | A | * | 3/1999 | Stoffel et al. | 347/43 |
| 5,913,972 | A |   | 6/1999 | Kanou et al. | |
| 6,037,390 | A | * | 3/2000 | Page et al. | 523/160 |
| 6,232,369 | B1 |  | 5/2001 | Ma et al. | |
| 6,329,446 | B1 |  | 12/2001 | Sacripante et al. | |
| 6,454,846 | B2 |  | 9/2002 | Yatake | |
| 6,458,192 | B1 |  | 10/2002 | Tsujio | |
| 6,500,248 | B1 |  | 12/2002 | Hayashi | |
| 6,548,571 | B1 |  | 4/2003 | Cheng et al. | |
| 6,676,736 | B2 |  | 1/2004 | Nakano et al. | |
| 6,794,425 | B1 |  | 9/2004 | Ellis et al. | |
| 6,916,861 | B2 |  | 7/2005 | Nomoto et al. | |
| 7,189,767 | B2 |  | 3/2007 | Gore et al. | |
| 2002/0077384 | A1 |  | 6/2002 | Sano et al. | |
| 2003/0055178 | A1 | * | 3/2003 | Gore et al. | 525/242 |
| 2004/0048973 | A1 |  | 3/2004 | Akutsu et al. | |
| 2004/0171718 | A1 |  | 9/2004 | Nakamura et al. | |
| 2005/0090599 | A1 | * | 4/2005 | Spinelli | 524/543 |
| 2005/0900599 |    |   | 4/2005 | Spinelli | |

FOREIGN PATENT DOCUMENTS

| JP | 58-038713 | 3/1983 |
| JP | 60026012 | 2/1985 |
| JP | 61-24792 | 11/1986 |
| JP | 62-95366 | 5/1987 |
| JP | 63-089574 | 4/1988 |
| JP | S 64-10023 | 2/1989 |
| JP | 01-170672 | 7/1989 |
| JP | 01-301760 | 12/1989 |
| JP | 04-306218 | 10/1992 |
| JP | 05-039447 | 2/1993 |
| JP | 06-009504 | 1/1994 |
| JP | 06-313141 | 11/1994 |
| JP | 09-151342 | 6/1997 |
| JP | 10-140065 | 5/1998 |
| JP | 10-195352 | 7/1998 |
| JP | 10-316909 | 12/1998 |
| JP | 11-269419 | 10/1999 |
| JP | 2001-152053 | 6/2001 |
| JP | 2001-247800 | 9/2001 |
| JP | 2002-47438 | 2/2002 |
| JP | 2002-88285 | 3/2002 |
| JP | 2002-249690 | 9/2002 |
| JP | 2002-338859 A | 11/2002 |
| JP | 2003-26940 | 1/2003 |
| JP | 2003-096358 A | 4/2003 |

OTHER PUBLICATIONS

English Translation of Claims of JP S 6410023 Dated Feb. 21, 1989.
Patent Abstract of JP 04-306218 Dated Oct. 29, 1992.
Patent Abstract of JP 06-009504 Dated Feb. 18, 1994.
Patent Abstract of JP 09-151342 Dated Jun. 10, 1997.
Patent Abstract of JP 10-316909 Dated Dec. 2, 1998.
Patent Abstract of JP 58-038713 Dated Mar. 7, 1983.
Patent Abstract of JP 63-089574 Dated Apr. 20, 1988.
Patent Abstracts of Japan 01-301760 Published May 12, 1989.
Patent Abstracts of Japan 61-247925 Published May 11, 1986.
Patent Abstracts of Japan 01-170672 Published May 11, 1986.

(Continued)

*Primary Examiner* — David Wu
*Assistant Examiner* — Vu A Nguyen
(74) *Attorney, Agent, or Firm* — Ladas & Parry LLP

(57) ABSTRACT

An aqueous ink composition comprising: a pigment, having a particle diameter as determined by the light scattering method of no less than 20 nm and no more than 200 nm; and a water dispersible polymer, having a styrene-equivalent number average molecular weight of as determined by gel permeation chromatography no less than 5000 and no more than 200000, having a surface tension of no less than 20 mN/m and no more than 40 mN/m, and wherein the abovementioned pigment is a polymer-coated pigment that is coated with the abovementioned water dispersible polymer, is provided. The water-dispersible polymer may be a copolymer of monomers, mainly comprising acrylic acid and/or methacrylic acid and an acrylate and/or methacrylate. With this ink composition, the printing quality can be improved.

11 Claims, No Drawings

OTHER PUBLICATIONS

Patent Abstracts of Japan 06-133141 Published Nov. 8, 1994.
Patent Abstracts of Japan 05-039447 Published Feb. 19, 1993.
Patent Abstracts of Japan 10-140065 Published May 26, 1998.
Patent Abstracts of Japan 2001-152053 Published Jun. 5, 2001.
Patent Abstracts of Japan 11-269419 Published Oct. 5, 1999.
Patent Abstracts of Japan 2001-247800 Published Sep. 11, 2001.
Patent Abstracts of Japan 2002-249690 Published Sep. 6, 2002.
English Abstract of Japanese Patent Publication 2002-88285 Published Mar. 27, 2002.

* cited by examiner

AQUEOUS INK COMPOSITION AND METHOD OF MANUFACTURING THE SAME

This application is a continuation of copending application Ser. No. 10/819,096 filed on Apr. 6, 2004 now U.S. Pat. No. 7,294,659, claims the benefit thereof and incorporates the same by reference.

BACKGROUND OF THE INVENTION

1. Field of the Invention

This invention concerns an aqueous ink composition, a method of manufacturing the same, a pigment dispersion polymer of an aqueous ink composition for ink jet recording, an ink jet recording method, and an ink jet recorded matter.

2. Description of the Prior Art

With prior-art aqueous inks, a surfactant was used as a means for dispersing a pigment in water or a dispersion polymer, having a hydrophobic part and a hydrophilic part, was used for dispersion. As methods of coating the surface of a colorant with a polymer, methods of using microcapsules, encapsulating a dye ink, as ink jet printer ink, methods of using a polymer-coated dye, wherein a dye is dissolved or dispersed in a water-insoluble solvent and emulsified in water using a surfactant, methods of using encapsulated objects, wherein a sublimating dispersion dye is dissolved or dispersed in at least one of water, a water-soluble solvent, and polyester, as microcapsules in a recording fluid, ink compositions comprising colored emulsion-polymerized particles and an aqueous material, and methods employing a phase inversion emulsification reaction or an acid precipitation method have been examined. Furthermore, as methods of using components of high refractive index, methods of providing microparticles of high refractive index, formed of an inorganic substance, on the surface of a pigment, etc., have been proposed. Various methods have also been examined in regard to polymer coating.

SUMMARY OF THE INVENTION

Prior-art aqueous inks were unstable in regard to various points. That is, firstly, when a surfactant, glycol ether, or other substance having a hydrophilic part and a hydrophobic exists, adsorption and desorption tend to occur readily, thus degrading the storage stability. With ordinary aqueous ink, a surfactant, glycol ether, or other substance having a hydrophilic part and a hydrophobic part is required to lower the blurring of the ink on paper. With an ink that does not use such a substance, the permeability into paper is inadequate, the types of paper on which uniform printing can be performed are limited, and degradation of the printing quality tends to occur.

Furthermore, when an additive for improving printing quality (acetylene glycol, acetylene alcohol, silicon-based surfactant di(tri)ethylene glycol monobutyl ether, (di)propylene glycol monobutyl ether, or 1,2-alkylene glycol or a mixture of these) is added to a prior-art dispersion, long-term storage stability cannot be realized, and due to poor redissolution of the ink, the ink tended to clog the nozzle of an ink jet head upon drying and attack and thereby lower the adhesion strength of an adhesive agent and other materials used among the materials making up the head, thus degrading the discharge stability. Also with a pigment dispersed using such a dispersant, residues of the dispersant remain in the ink system and the dispersant becomes separated from the pigment without contributing adequately to dispersion, causing the viscosity to become high. When the viscosity becomes high, the added amount of a pigment or other coloring material becomes restricted and adequate printing quality cannot be obtained, especially on regular paper.

There is also the issue that, with a pigment dispersed by such a dispersant, the residues of the dispersant remain in the ink system and the dispersant becomes separated from the pigment without contributing adequately to dispersion, causing the viscosity to become high. When the viscosity becomes high, the added amount of a pigment or other coloring material becomes restricted and adequate printing quality cannot be obtained, especially on regular paper. Furthermore in the case where an inorganic substance is used as in Japanese Published Unexamined Patent Application No. H11-269419, the particles settle under normal usage conditions due to being high in density and the color differs between the initial and end stages of printing.

Furthermore, in cases where the dispersion polymer has styrene as the principal component, a high-concentration ink will not have an adequate fixing property on paper or other recording medium and tends to yellow readily upon long-term storage of a printed matter.

An object of this invention is to provide an aqueous ink composition of excellent printing quality. Specifically, an object is to provide an aqueous ink composition with one or both of low blurring and high coloration properties on regular paper and adequate coloration and fixing properties on specialized paper. Another object of this invention is to provide an aqueous ink composition suited for ink jet recording, specifically, an aqueous ink composition with at least one of pigment dispersion stability, discharge stability, and low attacking of an adhesive agent or other material used for making up a head. Yet another object of this invention is to provide an aqueous ink polymer for obtaining such aqueous ink compositions, and an ink jet recording method and an ink jet recorded matter using such aqueous ink compositions.

The present inventors have completed the following invention upon examination of the various components of an aqueous ink composition.

The present invention provides an aqueous ink composition comprising: a pigment, having a particle diameter as determined by a light scattering method of no less than 20 nm and no more than 200 nm; and a water dispersible polymer, having a styrene-equivalent number average molecular weight as determined by gel permeation chromatography of no less than 5000 and no more than 200000. In addition, the aqueous ink composition normally contains water and a water-soluble organic compound. In this ink composition, the abovementioned particle size of the abovementioned pigment is preferably no less than 20 nm and no more than 150 nm and more preferably no less than 20 nm or 30 nm and no more than 100 nm. Or, the abovementioned particle size is preferably no less than 20 nm and no more than 80 nm. The abovementioned styrene-equivalent number average molecular weight is preferably no less than 10000 and more preferably no less than 20000. This molecular weight is preferably no more than 100000. Furthermore, the dispersion (Mw/Mn) of the abovementioned styrene-equivalent number average molecular weight is preferably no less than 2 and no more than 10. Also, the concentration of the abovementioned pigment is preferably no less than 3 weight % and more preferably no less than 4 weight %. Also the surface tension is preferably no less than 20 mN/m and no more than 40 mN/m. With this mode, the pigment is preferably a polymer-coated pigment that is coated by the abovementioned water dispersible polymer and is preferably obtained by phase inversion emulsification. Any aqueous ink composition described above is preferably used for ink jet recording.

In an aqueous ink composition of the invention, as one aspect, the water dispersible polymer is a copolymer of monomers, mainly comprising a carboxylic-group-containing monomer and an acrylate and/or methacrylate. The carboxylic-group-containing monomer is preferably acrylic acid and/or methacrylic acid. Furthermore, the water dispersible polymer is preferably a copolymer of monomers having acrylic acid, methacrylic acid, an acrylate, and a methacrylate at a proportion of 80 weight % or more of the total monomer weight.

In an aqueous ink composition of the invention, as another aspect, the water dispersible polymer is a copolymer of monomers having benzyl acrylate and/or benzyl methacrylate and having these benzyl monomers at an amount of no less than 40 weight % and no more than 80 weight % of the total monomer weight.

In an aqueous ink composition of the invention, as another aspect, the water dispersible polymer is a copolymer of monomers including paracumylphenoxyethylene glycol acrylate at least in part. In this aqueous ink composition, the water dispersible polymer is preferably a copolymer of monomers having paracumylphenoxyethylene glycol acrylate at an amount of no less than 50 weight % of the total monomer weight. The water dispersible polymer is preferably a copolymer of monomers including paracumylphenoxyethylene glycol acrylate, an acrylate other than the paracumylphenoxyethylene glycol acrylate, and acrylic acid at least in part and more preferably at an amount of no less than 80 weight % of the total monomer weight. The acrylate other than the paracumylphenoxyethylene glycol acrylate preferably includes the other acrylate includes benzyl acrylate and/or butyl acrylate. The preferable refractive index of said water dispersible polymer is no less than 1.50.

In an aqueous ink composition of the invention, as another aspect, the water dispersible polymer contains sulfur (S) at an amount of no less than 1 weight % and no more than 20 weight % of the total weight of said polymer. In the water aqueous ink composition in this aspect, the water dispersible polymer is preferably a copolymer of monomers mainly comprising a sulfur-containing monomer, an acrylate, and acrylic acid. Here, the acrylate includes benzyl acrylate and/or butyl acrylate. The sulfur-containing monomer is preferably a thioacrylate and/or a thiomethacrylate, more preferably phenyl thiomethacrylate. In this aqueous ink composition, the preferable refractive index of said water dispersible polymer is no less than 1.50.

In an aqueous ink composition of the invention, as another aspect, the water dispersible polymer is a copolymer of monomers including a urethane acrylate and/or a urethane methacrylate, a non-urethane acrylate and/or a non-urethane methacrylate, and a carboxylic-group-containing monomer at least in part, the total amount of allophanate bonds and biuret bonds with respect to the polymer solids is no more than 1.0 mmol/g, and the total amount of urethane bonds, urea bonds, allophanate bonds, and biuret bonds with respect to the polymer solids is no less than 10.0 mmol/g. In the aqueous ink composition in this aspect, the total amount of allophanate bonds and biuret bonds with respect to the polymer solids is preferably no more than 0.1 mmol/g. Furthermore, the total amount of urethane bonds, urea bonds, allophanate bonds, and biuret bonds with respect to the polymer solids is no less than 0.1 mmol/g. In the aqueous ink composition, the water dispersible polymer is preferably a copolymer of monomers having said urethane acrylate and/or said urethane methacrylate and said non-urethane acrylate and/or said non-urethane methacrylate at an amount of no less than 80 weight % of the total monomer weight. The water dispersible polymer is preferably a copolymer of a urethane acrylate, a non-urethane acrylate, and acrylic acid. The water dispersible polymer is preferably a copolymer having, at least as part of the monomers, benzyl acrylate and/or isobornyl acrylate as the non-urethane acrylate.

In an aqueous ink composition of the invention, as still another aspect, the water dispersible polymer is a copolymer of monomers having a urethane acrylate, a non-urethane acrylate including an alkyl acrylate, a cycloalkyl acrylate, and an aromatic acrylate, and acrylic acid as copolymer monomers, and having the urethane acrylate and the non-urethane acrylate at an amount of no less than 80 weight % of the total monomer weight, the total amount of urethane bonds, urea bonds, allophanate bonds, and biuret bonds with respect to the polymer solids is no less than 0.1 mmol/g and no more than 10.0 mmol/g, and the total amount of allophanate bonds and biuret bonds with respect to the polymer solids is no more than 11.0 mmol/g. The aqueous ink composition in this aspect may contain glycerin and/or trimethylolpropane.

An aqueous ink composition of the invention, as still another aspect, contains a 1,2-alkyldiol, having 5 to 8 carbons and a monoalkyl ether, with 4 to 10 carbons of an alkylene glycol having no more than 10 repeating units. The 1,2-alkyldiol is preferably 1,2-hexanediol and the alkylene glycol monoalkyl ether is preferably di(tri)ethylene glycol monobutyl ether.

This invention also provides a polymer for dispersion of a pigment in water, which is used in an ink composition for ink jet recording, the polymer having a styrene-equivalent number average molecular weight as determined by gel permeation chromatography of no less than 5000 and no more than 200000, being a copolymer of monomers mainly comprising a carboxylic-group-containing monomer and an acrylate and/or methacrylate, and having any of the characteristics (a) through (e) indicated below.

(a) the water dispersible polymer is a copolymer of monomers, having benzyl acrylate and/or benzyl methacrylate and having these benzyl monomers at an amount of no less than 40 weight % and no more than 80 weight % of the total monomer weight;

(b) the water dispersible polymer is a copolymer of monomers, having an acrylate and acrylic acid at an amount of no less than 80 weight % of the total monomer weight;

(c) the water dispersible polymer is a copolymer of monomers, containing paracumylphenoxyethylene glycol acrylate at least in part;

(d) the water dispersible polymer contains sulfur (S) at an amount of no less than 1 weight % and no more than 20 weight % of the total weight thereof, (e) the water dispersible polymer is a polymer of monomers, containing a urethane acrylate and/or a urethane methacrylate, a non-urethane acrylate and/or a non-urethane methacrylate, and acrylic acid and/or methacrylic acid at least in part, the total amount of allophanate bonds and biuret bonds with respect to the polymer solids is no more than 1.0 mmol/g, and the total amount of urethane bonds, urea bonds, allophanate bonds, and biuret bonds with respect to the polymer solids is no more than 10.0 mmol/g.

Furthermore, the present invention provides an aqueous ink composition production method comprising: a synthesis step of synthesizing a water dispersible polymer of any of the abovementioned modes; a pigment dispersion step of preparing a mixed liquid, containing the abovementioned water dispersible polymer, a pigment, an organic solvent, and water of an excess amount with respect to the abovementioned organic solvent, and dispersing the abovementioned pigment, with at least a part of the abovementioned polymer coated thereon, in the aqueous phase of the abovementioned mixed liquid; and a composition preparation step of preparing an aqueous ink composition using the polymer and the pigment, existing in the abovementioned aqueous phase, along with at least a part of the abovementioned aqueous phase or in a state of separation from the abovementioned aqueous phase. The abovementioned synthesis step is preferably a solution polymerization step and this may be initiated by a radical polymerization initiator.

The present invention also provides an ink jet recording method comprising: a step of depositing any of the abovementioned aqueous ink compositions to a recording medium surface by an ink jet recording method. The present invention also provides an ink jet recorded matter having dot patterns, comprising the any of the abovementioned aqueous ink composition formed by an ink jet recording method on the surface of a recording medium.

DESCRIPTION OF THE PREFERRED EMBODIMENT

One mode of this invention is an aqueous ink composition comprising: a pigment, having a particle diameter as determined by a light scattering method of no less than 20 nm and no more than 200 nm; and a water dispersible polymer, having a styrene-equivalent number average molecular weight as determined by gel permeation chromatography of no less than 5000 and no more than 200000, and another mode is a polymer for pigment dispersion for ink jet recording. Another mode is an aqueous ink manufacturing method, another mode is an ink jet recording method, and yet another mode is an ink jet recorded matter. In the following, the various modes of this invention shall be described in detail. In the present Specification, "(meth)acrylic" shall mean both "acrylic" and "methacrylic," and "(meth)acrylate" shall mean both "acrylate" and "methacrylate." Also, in this Specification, unless noted otherwise, "%" shall indicate weight % and "parts" shall indicate weight parts.

(Pigment)

The pigment contained in this invention's aqueous ink composition preferably has a particle diameter of no less than 20 nm and no more than 200 nm. With a particle diameter of 20 nm or less, the light resistance and gas resistance are lowered. When the particle diameter exceeds 200 nm, it becomes hard for gloss to be exhibited on specialized paper and a difference in gloss with respect to an unprinted part will occur upon printing. More preferably, the particle diameter is no less than 30 nm. The particle diameter is also preferably no more than 150 mm, more preferably no more than 100 nm, and even more preferably no more than 80 nm. In particular, when the particle diameter of the pigment exceeds 80 nm, gloss can be secured on specialized paper even when the concentration of the pigment is high. From the above, the particle diameter is preferably no less than 20 nm and no more than 80 nm, more preferably no less than 20 nm and no more than 70 nm, and even more preferably no less than 30 nm and no more than 65 nm. In the present Specification, "the particle diameter of a pigment" shall refer to the particle diameter of a pigment in a form in which it is not coated at all. Also, "particle diameter as determined by a light scattering method" shall refer to the average particle diameter as determined by a light scattering method.

An inorganic pigment or an organic pigment may be used as the pigment. As an inorganic pigment, titanium oxide, iron oxide, etc., may be used. Examples of organic pigments that may be used include azo pigments (including azo lakes, insoluble azo pigments, condensed azo pigments, chelated azo pigments, etc.), polycyclic pigments (including phthalocyanine pigments, perylene pigments, perinone pigments, anthraquinone pigments, quinacridone pigments, dioxan pigments, thioindigo pigments, isoindolinone pigments, quinophthalone pigments, etc.), nitro pigments, nitroso pigments, aniline black, etc.

Examples of pigments for black ink include carbon blacks (C. I. Pigment Black 7), such as furnace black, lamp black, acetylene black, channel black, etc., metals, such as copper oxides, iron oxides (C. I. Pigment Black 11), titanium oxide, etc., and organic pigments, such as aniline black (C. I. Pigment Black 1), etc. A carbon black, which is comparatively low in specific density and does not settle readily in water, is preferable for ink jet printing.

Furthermore, for color inks, C. I. Pigment Yellow 1 (Fast Yellow G), 3, 12 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 120, 128, 138, 153, and 180, C. I. Pigment Red 1, 2, 3, 5, 17, 22 (Brilliant Fast Scarlet), 23, 31, 38, 48:2 (Permanent Red 2B (Ba)), 48:1 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 209, and 219, C. I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, and 63, and C. I. Pigment Green 1, 4, 7, 8, 10, 17, 18, and 36, etc., may be used. However, the pigments are not limited to the above. The content of the pigment in the ink composition is preferably no less than 0.5% and no more than 30%, more preferably in the range of no less than 1.0%, and even more preferably in the range of no less than 2%. Yet even more preferably, the content is no less than 3% and more preferably no less than 4%. The upper limit is more preferably no more than 12% and even more preferably no more than 8%. With the present ink composition, the preferable form of the pigment is a polymer-coated pigment. The polymer-coated pigment shall be described later.

(Water Dispersible Polymer)

A water dispersible polymer of the present invention preferably has a styrene-equivalent number average molecular weight as determined by gel permeation chromatography (GPC) of no less than 5000 and no more than 200000. Due to the characteristics of a vehicle that is used in using the polymer in an ink composition, the polymer will tend to separate and cause adverse effects when the molecular weight thereof is less than 5000, that is to be more specific, an adhesive agent, etc., used in a head will tend to be attacked readily by the separated polymer and an additive for improving the printing quality, such as an acetylene glycol surfactant, acetylene alcohol surfactant, silicon-based surfactant, or other surfactant among various types, di(tri)ethylene glycol monobutyl ether, dipropylene glycol monobutyl ether, or 1,2-alkylene glycol, or a mixture of such additives. When the molecular weight exceeds 200000, the viscosity of the ink tends to rise and it becomes difficult to obtain a stable dispersion. The molecular weight is more preferably no less than 10000 or no less than 20000. The molecular weight is also preferably no more than 100000.

Also, with a urethane-based water dispersible polymer to be described layer, the styrene-equivalent number average molecular weight as determined by GPC is preferably no less than $2 \times 10^4$. This is because the dispersion stability of the pigment degrades when the molecular weight is less than $2\times10^4$. Also, from the standpoint of dispersion stability of the pigment, the molecular weight is preferably no more than $10\times10^4$. This is because the dispersion stability of the pigment degrades significantly when the molecular weight exceeds $10\times10^4$. The molecular weight is more preferably no less than $3\times10^4$ and even more preferably no less than $5\times10^4$ and no more than $8\times10^4$. From the standpoint of fixing property on glossy paper, the molecular weight is preferably no less than $2\times10^4$ and no more than $20\times10^4$. This is because, the fixing and gloss properties on glossy paper degrade when the molecular weight is less than $2\times10^4$ or more than $20\times10^4$. The molecular weight is more preferably no less than $2\times10^4$ and even more preferably no less than $5\times10^4$.

The dispersion of the styrene-equivalent molecular weight (the ratio (Mw/Mn) of the weight average molecular weight (Mw) with respect to the number average molecular weight (Mn)) of the present polymer as determined by GPC is preferably no less than 2 and no more than 10. In this range, dispersion stability can be realized and increase of the viscosity of the ink can be restrained to prevent the dispersion from becoming unstable. The molecular weight dispersion is more preferably no less than 2 and no more than 4 and even more preferably no less than 2.5 and no more than 4.

The water dispersible polymer may be formed of any or two or more types of various known polymers such as polyacrylic acid esters, styrene-acrylic acid copolymers, polystyrenes, polyesters, polyamides, polyimides, silicon-containing polymers, sulfur-containing polymers, etc. Also, in order to improve the fixing and coloration properties by the water dispersible polymer, the polymer preferably contains an acryloyl group, methacryloyl group, ethyleneoxy group, propyleneoxy group, hydroxyl group, amino group, amido group, furan group, thiophene group, pyrrolidone group, imidazole group, imidazoline group, lactone group, lactam group, carbonate group, epoxy group, urethane group, urea group, allophanate group, biuret group, or isocyanurate group, etc.

As the water dispersible polymer for dispersing the pigment, a polymer, using a monomer or oligomer having an acryloyl group, methacryloyl group, vinyl group or aryl group with a double bond, may be used. Examples of monofunctional monomers that may be used include styrene, ($\alpha$, 2, 3, or 4)-alkylstyrenes, ($\alpha$, 2, 3, or 4)-allkoxystyrenes, 3,4-dimethylstyrene, $\alpha$-phenylstyrene, divinylbenzene, vinylnaphthalenes, methyl(meth)acrylate, ethyl(meth)acrylate, propyl (meth)acrylate, butyl(meth)acrylate, ethylhexyl(meth) acrylate, other alkyl(meth)acrylates, methoxydiethylene glycol (meth)acrylate, (meth)acrylates of diethylene glycols or polyethylene glycols with an ethoxy group, propoxy group, butoxy group, phenoxy group, or paracumylphenoxy group, cyclohexyl(meth)acrylate, benzyl(meth)acrylate, phenoxyethyl(meth)acrylate, isobornyl(meth)acrylate, hydroxyalkyl(meth)acrylates, dimethylamino(meth)acrylate, dimethylaminoethyl(meth)acrylate, dimethylaminopropyl acrylamide, N,N-dimethylaminoethyl acrylate, acryloyl morpholine, N,N-dimethylacrylamide, N-isopropylacrylamide, N,N-diethylacrylamide, other fluorine-containing, chlorine-containing, and sulfur-containing (meth)acrylates, silicon-containing (meth)acrylates, (meth)acrylamide, maleic acid amide, (meth)acrylic acid, etc. For introducing a crosslinked structure, compounds having an acryloyl group or methacryloyl group, such as (mono, di, tri, tetra, poly)ethylene glycol di(meth)acrylate, (meth)acrylate of 1,4-butanediol, 1,5-pentanediol, 1,6-hexanediol, 1,8-octane diol, or 1,10-decanediol, trimethylolpropane tri(meth)acrylate, glycerin (di, tri)(meth) acrylate, di(meth)acrylate of an ethylene oxide adduct of bisphenol A or F, neopentyl glycol di(meth)acrylate, pentaerythritol tetra(meth)acrylate, dipentaerythritol hexa(meth) acrylate, etc., may be used.

The water dispersible polymer preferably has a carboxylic group for adding hydrophilicity. As a carboxylic group in this polymer, acrylic acid, methacrylic acid, crotonic acid, propylacrylic acid, isopropylacrylic acid, itaconic acid, or fumaric acid may be used. ω-carboxy-polycaprolactone monoacrylate, phthalic acid monohydroxyethyl acrylate, acrylic acid dimer, etc., may also be used. Just one of these carboxylic groups may be used or two or more may be used in combination, and preferably the carboxylic group is acrylic acid and/or methacrylic acid.

The present water dispersible polymer is preferably a copolymer having a carboxylic-group-containing monomer and an acrylate and/or methacrylate as the main components. Also, the proportion of acrylic acid, methacrylic acid, acrylate, and methacrylate with respect to the total monomer weight is preferably no less than 80%. If this proportion is less than 80%, good dispersion properties will not be obtained readily. The proportion is more preferably no less than 90% and even more preferably 100%.

(Benzyl-Group-Containing Water Dispersible Polymer)

The present water dispersible polymer preferably also contains benzyl acrylate and/or benzyl methacrylate at a proportion of no less than 40% and no more than 80% with respect to the total monomer weight. If the total amount of acrylic monomers and methacrylic monomers that have benzyl groups is less than 40%, coloration on PPC paper or other regular paper will be low, and when 80% is exceeded, dispersion stability becomes difficult to achieve. With a benzyl-group-containing water dispersible polymer, the monomers other than benzyl acrylate and benzyl methacrylate are preferably acrylic acid and/or methacrylic acid and other acrylates and/or methacrylates. The polymer is preferably copolymerized from just these monomers.

Examples of acrylates and methacrylates that may be used in the invention include commercially available (meth)acrylates, such as methyl(meth)acrylate, ethyl (meth)acrylate, propyl(meth)acrylate, butyl(meth)acrylate, hexyl(meth) acrylate, cyclohexyl(meth)acrylate, octyl(meth)acrylate, lauryl(meth)acrylate, 2-ethylhexyl (meth)acrylate, 2-ethylhexylcarbitol (meth)acrylate, phenol EO modified (meth)acrylate, N-vinylpyrrolidone, isobornyl(meth)acrylate, benzyl(meth) acrylate, paracumylphenol EO modified (meth)acrylate, 2-hydroxyethyl-3-phenoxypropyl (meth)acrylate, etc. Also, in place of acrylic acid and methacrylic acid, ω-carboxy-polycaprolactone mono(meth)acrylate, phthalic acid monohydroxyethyl (meth)acrylate, (meth)acrylic acid dimer, etc. The benzyl-group-containing water dispersible polymer has a styrene-equivalent number average molecular weight of preferably no less than 20000 and no more than 200000 and more preferably no less than 20000 and no more than 100000. Butyl(meth)acrylate is preferably contained as the (meth) acrylate.

(Acrylic Acid-Acrylate-Based Water Dispersible Polymer)

The present water dispersible polymer is preferably a copolymer with a monomer composition wherein the proportion of acrylate and acrylic acid with respect to the total monomer weight is no less than 80%. When this proportion is less than 80%, the fixing and gloss properties on specialized paper are lowered. The proportion is more preferably no less than 90% and even more preferably 100%. Examples of acrylates that may be used include commercially available acrylates, such as methyl acrylate, ethyl acrylate, propyl acrylate, butyl acrylate, hexyl acrylate, cyclohexyl acrylate, octyl acrylate, lauryl acrylate, 2-ethylhexyl acrylate, 2-ethylhexylcarbitol acrylate, phenol EO modified acrylate, N-vinylpyrrolidone, isobornyl acrylate, benzyl acrylate, paracumylphenol EO modified acrylate, 2-hydroxyethyl-3-phenoxypropyl acrylate, etc. Also, in place of acrylic acid, ω-carboxy-polycaprolactone monoacrylate, phthalic acid monohydroxyethyl acrylate, acrylic acid dimer, etc., may be used. Preferably, benzyl acrylate and/or butyl acrylate is used. More preferably, the polymer is a copolymer of monomers containing benzyl acrylate at a proportion of no less than 40% and no more than 80% of the total monomer weight. The acrylic acid-acrylate-based water dispersible polymer has a styrene-equivalent number average molecular weight of preferably no less than 20000 and no more than 200000 and more preferably no less than 20000 and no more than 100000.

(Water Dispersible Polymer Having Paracumylphenoxyethylene Glycol Acrylate as a Monomer)

Also, the present water dispersible polymer is preferably a copolymer using paracumylphenoxyethylene glycol acrylate as a monomer. By containing paracumylphenoxyethylene glycol acrylate, since the refractive index of the polymer is improved and yet the glass transition temperature is not increased, the gloss and fixing properties on glossy paper improve. Preferably, the proportion of this monomer with respect to the total monomer weight is no less than 10%, more preferably no less than 20%, even more preferably no less than 30%, and yet even more preferably no less than 50%.

With a water dispersible polymer containing paracumylphenoxyethylene glycol acrylate as a monomer component, the polymer is preferably a copolymer, wherein the total amount of paracumylphenoxyethylene glycol acrylate, acrylates other than paracumylphenoxyethylene glycol acrylate, and acrylic acid with respect to the total monomer weight is no less than 80%. If this amount is no less than 80%, the fixing and gloss properties on specialized paper will be lowered. The amount is more preferably no less than 90% and even more preferably 100%. Though as the abovementioned other acrylates, one or two or more types among the various acrylates mentioned above may be used, benzyl acrylate and/or butyl acrylate is preferably contained.

The copolymer containing paracumylphenoxyethylene glycol acrylate as a monomer component preferably has a refractive index of no less than 1.50. When the refractive index is no less than 1.50, the coloration on regular paper and the gloss and fixing properties on glossy paper are improved. The refractive index may be measured by preparing a film-like sample, with which solvent and water have been removed from the polymer, and measuring with a refractometer (for example, Abbe's refractometer 3T) or a measuring device of equivalent precision. This copolymer water dispersible polymer has a styrene-equivalent number average molecular weight of preferably no less than 20000 and no more than 200000 and more preferably no less than 20000 and no more than 100000.

(Sulfur-Containing Water Dispersible Polymer)

The present water dispersible polymer preferably contains sulfur (S) at an amount of no less than 1% and no more than 20% of the total weight of the polymer. At an amount less than 1%, though the refractive index can be improved by other components, the fixing property is lowered, and in the excess of 20%, dispersion becomes unstable and difficult to achieve. More preferably, the lower limit is no less than 3% and the upper limit is no more than 15%. The sulfur in the polymer can be measured by elemental analysis using the 2400CHN Elemental Analyzer (made by Perkin Elmer Inc. (USA)) or a measurement device by which a similar precision can be obtained.

This sulfur-containing water dispersible polymer is preferably a copolymer of monomers, mainly comprising a sulfur-containing monomer, an acrylate, and acrylic acid or monomers formed from such monomers. The acrylate here does not include the sulfur-containing monomer even if the sulfur-containing monomer is an acrylate. That is, this acrylate is an acrylate that does not contain sulfur. As the sulfur-containing monomer, a monomer, having an acryloyl group, methacryloyl group, vinyl group, or aryl group that has a double bond and wherein an oxygen atom has been replaced by a sulfur atom, may be used. Specifically, various thioacrylates and/or thiomethacrylates may be used as the sulfur-containing monomer. Thiomethacrylates are preferably used and among these, the use of phenyl thiomethacrylate is preferable.

As the acrylate in the sulfur-containing water dispersible polymer, one or two or more types among the various acrylates mentioned above may be used. Benzyl acrylate and/or butyl acrylate is preferably contained. The sulfur-containing water dispersible polymer also preferably has a refractive index of no less than 1.50 from the standpoint of coloration on regular paper and gloss and fixing properties on glossy paper. This sulfur-containing water dispersible polymer has a styrene-equivalent number average molecular weight of preferably no less than 20000 and no more than 200000 and more preferably no less than 10000 and no more than 100000.

(Urethane-Based Water Dispersible Polymer)

The present water dispersible polymer is preferably a copolymer of monomers, including at least in part, an urethane acrylate and/or urethane methacrylate, a non-urethane acrylate and/or non-urethane methacrylate, and acrylic acid and/or methacrylic acid as monomer components, with the total amount of allophanate bonds and biuret bonds with respect to the polymer solids being no more than 11.0 mmol/g and the total amount of urethane bonds, urea bonds, allophanate bonds, and biuret bonds with respect to the polymer solids being preferably no more than 10.0 mmol/g.

The urethane-based water-dispersible polymer is a copolymer that is copolymerized with an urethane acrylate and/or urethane methacrylate and a non-urethane acrylate and/or non-urethane methacrylate as main components and having a carboxylic-group-containing monomer as a monomer component. Though the urethane-based water dispersible polymer may contain other monomer components, it preferably has just the polymerized units of the above. With the urethane-based water dispersible polymer, the proportion of the urethane (meth)acrylate and non-urethane (meth)acrylate monomers among the total monomers that are polymerized is preferably no less than 80%. This is because when this monomer proportion is no less than 80%, adequate dispersion stability and gloss and fixing properties on glossy paper can be obtained. The abovementioned proportion is more preferably no less than 85%. The proportion of these (meth)acrylate monomers is preferably no more than 98% and more preferably no more than 95%. This is because otherwise, the dispersibility in water is lowered due to the relationship with the carboxylic-group-containing monomer. The proportion of (meth)acrylic acid or other carboxylic-group-containing monomer is preferably no less than 5% and no more than 10%. This is because, when this proportion is no less than 5% and no more than 10%, adequate dispersibility in water and adequate coloration can be secured.

Also, with the urethane-based water dispersible polymer, the proportion of a urethane (meth)acrylate monomer is preferably no less than 1.0% and no more than 50%. When this proportion is less then 1.0%, the fixing property is poor, and in the excess of 50%, the viscosity becomes too high with an aqueous system such as that of this invention and dispersion in water becomes unstable. Furthermore, the present polymer preferably does not have polymerization units of aromatic vinyl monomers, such as styrene, 2-methylstyrene, vinyltoluene, t-butylstyrene, chlorostyrene, vinylanisole, vinylnaphthalene, etc. By not containing styrene monomer units, yellowing of recorded images, etc., can be avoided.

With the urethane-based water dispersible polymer, just acrylates are preferably used as the urethane (meth)acrylate and the non-urethane (meth)acrylate. This is because by using acrylates, the gloss property on glossy paper can be improved. Also, though acrylic acid and/or methacrylic acid may be used as the carboxylic-group containing monomer, preferably just acrylic acid is used.

The urethane-based water dispersible polymer can be obtained by polymerizing the following polymerizable monomers (including oligomers).

(Non-Urethane (Meth)Acrylate)

"Non-urethane (meth)acrylate" refers to a (meth)acrylate other than urethane (meth)acrylates. Though not restricted in particular, for example, a (meth)acrylate that is a branched or unbranched chain aliphatic ester, alicyclic ester, or aromatic ester, etc., of (meth)acrylic acid may be used, and specific examples that may be used include methyl(meth)acrylate, ethyl(meth)acrylate, propyl(meth)acrylate, ethylhexyl (meth)acrylate, n-butyl(meth)acrylate, isobutyl(meth)acrylate, n-amyl(meth)acrylate, isoamyl(meth)acrylate, n-hexyl (meth)acrylate, 2-ethylhexyl(meth)acrylate, hexyl (meth) acrylate, tetrahydrofurfuryl(meth)acrylate, cyclohexyl (meth)acrylate, octyl (meth)acrylate, decyl(meth)acrylate, lauryl(meth)acrylate, octadecyl(meth)acrylate, 2-ethylhexylcarbitol (meth)acrylate, phenol EO modified (meth)acrylate, N-pyrrolidone, paracumyl EO modified (meth)acrylate, 2-hydroxyethyl-3-phenoxypropyl (meth)acrylate, benzyl (meth)acrylate, phenoxyethyl(meth)acrylate, isobornyl (meth)acrylate, methoxydiethylene glycol (meth)acrylate, ethoxy-group-containing diethylene glycol (meth)acrylates, propoxy-group-containing diethylene glycol (meth)acrylates, butoxy-group-containing diethylene glycol (meth) acrylates, ethoxy-group-containing polyethylene glycol (meth)acrylates, propoxy-group-containing polyethylene glycol (meth)acrylates, butoxy-group-containing polyethylene glycol (meth)acrylates, hydroxyalkyl methacrylates, hydroxyalkyl acrylates, dimethylamino methacrylate, dimethylamino acrylate, and dimethylaminoethyl methacrylate.

As an alkyl(meth)acrylate, a straight chain or branched alkyl(meth)acrylate with 2 to 12 carbons may be used, as a cycloalkyl(meth)acrylate, a cycloalkyl (which may be substituted with an alkyl group with 1 or 2 carbons) (meth)acrylate with 5 to 7 carbons may be used, and as an aromatic (meth) acrylate, a (meth)acrylate, having a single aromatic ring (which may have an alkenyl group), may be used favorably.

One type of these various (meth)acrylates may be used or two or more types may be used in combination. Preferably, one type or two or more types selected from among the abovementioned alkyl(meth)acrylates, cycloalkyl(meth) acrylates, and aromatic (meth)acrylates is or are used, and more preferably just these acrylates are used. Examples of such preferable acrylates include n-butyl acrylate, benzyl acrylate, cyclohexyl acrylate, isobornyl acrylate, lauryl acrylate, and 2-ethylhexyl acrylate.

(Urethane (Meth)Acrylate)

The present polymer may contain a predetermined amount of urethane bonds, urea bonds, allophanate bonds, and biuret bonds, and such bonds are preferably supplied to the present polymer by a urethane (meth)acrylate. The urethane chain part of a urethane (meth)acrylate at least contains a urethane bond and contains any or two or more types of bonds among urea bonds, allophanate bonds, and biuret bonds.

A urethane (meth)acrylate may take any of various forms. For example, a urethane (meth)acrylate may be obtained by reacting a urethane oligomer, obtained by the reaction of an organic polyisocyanate and a diol or of a diol and a diamine, with a hydroxyl-group-containing (meth)acrylate. In the present polymer, either or both of a urethane acrylate and a urethane methacrylate may be used. It is more preferable to use just a urethane acrylate.

(Urethane Oligomer)

As an organic polyisocyanate for obtaining a urethane oligomer, a known aliphatic diisocyanate, alicyclic diisocyanate, aromatic isocyanate, or a modified form of any of these may be used. Examples of diisocyanates include trilene diisocyanate (TDI), 4,4'-diphenylmethane diisocyanate (MDI), xylylene diisocyanate (XDI), naphthylene diisocyanate (NDI), paraphenylene diisocyanate (PPDI), tetramethylxylylene diisocyanate (TDI), hexamethylene diisocyanate (HMDI), cyclohexyl diisocyanate (CHDI), dicyclohexylmethane diisocyanate (CHMDI), isophorone diisocyanate (IPDI), lysine diisocyanate (LDI), isopropylidene bis(4-cyclohexyldisocyanate) (IPC), hydrogenated xylylene diisocyanate (hydrogenated XDI), tolidine diisocyanate (TODI), toluoylene diisocyanate, phenylmethane diisocyanate, etc.

Also, in this invention, modified forms of the above, which have or can form a urethane bond, urea bond, allophanate bond, or biuret bond, may be used. A modified form having a urethane bond is obtained by modifying an isocyanate monomer or a diisocyanate monomer with a scarce amount of polyol, and a modified form having a urea bond is obtained by modifying an abovementioned monomer with a scarce amount of polyamine. A modified form having an allophanate bond is a modified form having an isocyanate group added to a urethane bond, and a modified form having a biuret bond is a modified form having an isocyanate group added to a urea bond. Such modified forms are described for example in Japanese Published Examined Patent Application No. S64-10023, Japanese Published Unexamined Patent Application No. S58-38713, Japanese Published Examined Patent Application No. S63-89574, Japanese Published Unexamined Patent Application No. H6-9504, Japanese Published Unexamined Patent Application No. H4-306218, etc.

As the polyol or polyol and diamine to be reacted with the organic polyisocyanate, a known polyol compound and/or diamine compound may be used without particular restrictions. Examples of diol compounds include diol compounds, such as ethylene glycol, dipropylene glycol, 1,2-butanediol, 1,4-butanediol, 1,6-hexanediol, cyclohexane-1,4-dimethanol, polytetramethylene glycol, and polypropylene glycol, polyester compounds, which are reaction products of such diol compounds with a polybasic acid, such as adipic acid, succinic anhydride, isophthalic acid, phthalic anhydride, terephthalic acid, tetrahydrophthalic anhydride, hexahydrophthalic anhydride, azelaic acid, etc., and polycaprolactone diol and other reaction products of the abovementioned diol compounds with e-caprolactone. Example of diamine compounds include hexamethylenediamine, 1,7-diaminoheptane, 1,8-diaminooctane, 1,9-diaminononane, o-phenylenediamine, m-phenylenediamine, etc. Compounds having a hydroxyl group or an amino group as an active hydrogen group may also be used. Also for the synthesis of a urethane oligomer, isocyanate ethyl (meth)acrylate or other (meth) acrylate, having an isocyanate group as a functional group, may be used.

Examples of hydroxyl-group-containing (meth)acrylates include 2-hydroxyethyl(meth)acrylate, 2-hydroxypropyl (meth)acrylate, 1,4-butanediol (meth)acrylate, polyethylene glycol (meth)acrylate, polypropylene mono(meth)acrylate, e-caprolactone adduct of 2-hydroxyethyl mono(meth)acrylate, 2-hydroxy-3-phenyloxypropyl(meth)acrylate, pentaerythritol (meth)acrylate, etc. With this invention, one of the above compounds may be used or two or more of the above compounds may be used in combination, and preferably a hydroxyl-group-containing acrylate is used.

The amount of urethane bonds, urea bonds, allophanate bonds, and biuret bonds in a urethane (meth)acrylate obtained from a urethane oligomer and an organic polyisocyanate can be adjusted in each of the urethane oligomer and/or organic polyisocyanate. That is, one skilled in the art can adjust the contained amount of such bonds by suitable selection of the organic polyisocyanate, diol, and, where necessary, diamine and adjustment of the reaction conditions. As already described, the content of the urethane bonds, etc., in the urethane (meth)acrylate concerned can be determined by performing back titration, via decomposition treatment using butylamine, and GC-MS. A urethane (meth)acrylate that may be used in this invention may be synthesized as suited or obtained as a commercially available urethane (meth)acrylate. Examples of such urethane acrylates and urethane methacrylates include CN961 (made by Nippon Kayaku Co., Ltd.), the Beam Set 500 Series (502M, 505A6, 510, 550B, 570, etc.), made by Arakawa Chemical Industries, Ltd., SH-500B, made by Negami Chemical Industrial Co., Ltd., etc.

(Carboxylic-Group-Containing Monomer)

The present polymer preferably has a carboxylic group for providing hydrophilicity. As the carboxylic group in the present polymer, acrylic acid, methacrylic acid, crotonic acid, propyl acrylic acid, isopropyl acrylic acid, itaconic acid, or fumaric acid may be used. ω-carboxy-polycaprolactone monoacrylate, phthalic acid monohydroxyethyl acrylate, acrylic acid dimer, etc., may also be used. Just one of the above groups may be used or two or more may be used in combination, preferably acrylic acid and/or methacrylic acid is used, and more preferably acrylic acid is used.

In producing the urethane-based water dispersible polymer, other polymerizable monomers may be used within a range in which the achievement of invention's objects will not be obstructed. Examples of such monomers include vinyl ester monomers, such as vinyl acetate, etc., vinyl cyan compound monomers, such as acrylonitrile, methacrylonitrile, etc., halogenated monomers, such as vinylidene chloride, vinyl chloride, etc., olefin monomers, such as ethylene, propylene, isopropylene, etc., and diene monomers, such as butadiene, chloroprene, etc. Vinyl monomers, such as vinyl ether, vinyl ketone, vinylpyrrolidone, etc., may also be cited as examples.

(Urethane Bonds, Urea Bonds, Allophanate Bonds, and Biuret Bonds)

Though the urethane-based water dispersible polymer has a urethane (meth)acrylate as a polymerization unit and has at least urethane bonds, with the present polymer, the total amount of allophanate bonds and biuret bonds is preferably no more than 1.0 mmol/g with respect to the polymer solids. This is because when 1.0 mmol/g is exceeded, the dispersion stability of the pigment degrades significantly. More preferably, the abovementioned amount is no more than 0.1 mmol/g. That is, from the standpoint of dispersion stability, the monomer composition, polymerization conditions, etc., are preferably selected so that allophanate bonds and biuret bonds will not be contained. Also with the present polymer, the total amount of urethane bonds, urea bonds, allophanate bonds, and biuret bonds with respect to the polymer solids is preferably no more than 10.0 mmol/g. This is because in the excess of 10.0 mmol/g, the dispersion stability of the pigment degrades. The total amount of these four types of bonds is preferably no less than 0.1 mmol/g. This is because at an amount less than 0.1 mmol/g, the fixing property on glossy paper is lowered.

Furthermore with the urethane-based water dispersible polymer, the total amount of urethane groups and urea groups with respect to the polymer solids is preferably no less than 0.8 mmol/g and no more than 1.3 mmol/g. This is because within this range, good dispersion stability and good fixing property on glossy paper can be obtained readily. Even if the present polymer contains just urethane bonds, the fixing property on glossy paper and the dispersion stability can be adjusted by controlling the total amount of these various types of bonds.

(Method for Measuring Urethane Bonds, Urea Bonds, Allophanate Bonds, and Biuret Bonds)

The respective amounts and the respective abovementioned total amounts of the abovementioned bonds in a urethane-based water dispersible polymer can be measured as follows. That is, after selective decomposition of allophanate and biuret bonds in the present polymer by an amine, the content (equivalents) of these bonds are determined by back titration of the unreacted amine, and by using GC-MS (gas chromatography-mass spectroscopy) on the amine decomposition product, the unreacted urethane bonds and urea bonds, including the urethane bonds and urea bonds generated from the biuret bonds and allophanate bonds by the amine decomposition, are measured. The respective amounts and the various total amounts of the urethane bonds, etc., can thus be determined. With the present polymer, n-butylamine may be used to decompose the allophanate bonds and biuret bonds under conditions in which the urethane bonds and urea bonds will not be decomposed. Specifically, the quantitative process using n-butylamine may be one wherein an excess amount of n-butylamine is added to the present polymer, and after leaving for 24 hours at 40° C., back titration with a hydrochloric acid solution of 0.1% concentration is performed. The various bond amounts and various total amounts may also be measured by another method as long as accuracy and precision equivalent to those of the above-described method can be obtained. Such other methods include methods of analysis using amine decomposition and then using proton NMR or gas chromatography, methods of performing hydrolysis using a pyridine after performing amine decomposition, etc. In regard to the measurement of these various bond amounts, etc., reference can be made to Kenichi Watanabe et. al., "Quantification of allophanate bonds in thermosetting polyurethanes by proton nuclear magnetic resonance analysis of amine decomposition and pyridine decomposition," Bunseki Kagaku (Japan Analyst) Vol. 44, No. 1, p. 49 (1995), etc.

(Water-Dispersible Polymer Production Method)

The above-described water-dispersible polymers can be obtained by solution polymerization or emulsion polymerization. As the polymerization initiator, potassium persulfate or ammonium persulfate may be used, and besides these, a general initiator used in radical polymerization, such as hydrogen persulfate, azobisisobutyronitrile, azobisisovaleronitrile, azobisacetoxyphenylethane, azobismethylbutanamidodihydrochloride tetrahydrate, azobismethylbutyronitrile, azobiscyclohexanecarbonitrile, dimethyl azobisisobutyrate, azobiscyanovaleric acid, benzoyl peroxide, dibutyl peroxide, peracetic acid, cumene hydroperoxide, t-butyl hydroxyperoxide, para-menthane hydroxyperoxide, etc., may be used.

Also a chain transfer agent may be added, where necessary in the process of polymerization. Examples of chain transfer agents include mercaptans, such as octyl mercaptan, n-dodecyl mercaptan, t-dodecyl mercaptan, n-hexadecyl mercaptan, n-tetradecyl mercaptan, t-tetradecyl mercaptan, etc.; xanthogen disulfides, such as dimethyl xanthogen disulfide, diethyl xanthogen disulfide, diisopropyl xanthogen disulfide, etc.; thiuram disulfides, such as tetramethyl thiuram disulfide, tetraethyl thiuram disulfide, tetrabutyl thiuram disulfide, etc.; halogenated hydrocarbons, such as carbon tetrachloride, ethylene bromide, etc.; hydrocarbons, such as pentaphenylethane, etc.; unsaturated cyclic hydrocarbon compounds, such as acrolein, methacrolein, aryl alcohols, 2-ethylhexyl thioglycolate, terpinolene, α-terpinene, γ-terpinene, dipentene, α-methylstyrene dimer (that which has no less than 50 weight parts of 2,4-diphenyl-4-methyl-1-pentene is preferable), 9,10-dihydroanthracene, 1,4-dihydronaphthalene, indene, 1,4-cyclohexadiene, etc; and unsaturated heterocyclic compounds, such as xanthene, 2,5-dihydrofuran, etc.

In the process of polymerization, a surfactant may be added as necessary. As the surfactant, sodium lauryl sulfate or potassium lauryl sulfate may be used, and besides these, an anionic surfactant, nonionic surfactant, or amphoteric surfactant may be used.

The polymerization may be carried out as solution polymerization under the presence of abovementioned polymerization initiator and in a solvent, such as an aliphatic hydrocarbon solvent, aromatic hydrocarbon solvent, ester solvent, ketone solvent, alcohol solvent, aprotic solvent, etc. The polymerization is normally carried out at 30 to 100° C. and preferably at 50 to 80° C. for 1 to 10 hours, and the conditions are selected as suited according to the types of polymerization initiator, monomer, solvent, etc., that are used. Also, the polymerization is preferably carried out under nitrogen or other inert gas atmosphere. After polymerization, the copolymer can be isolated by a known method, such as reprecipitation, solvent distillation, etc. Also, the obtained copolymer can be removed of unreacted monomer, etc., and refined by reprecipitation, membrane separation, chromatography, extraction, etc.

A polymer with a carboxylic group, such as the present polymer, is preferably ionized by a neutralizer (alkaline agent). As the neutralizer (alkaline agent), an inorganic alkali, such as sodium hydroxide, potassium hydroxide, lithium hydroxide, etc., or an organic amine, such as ammonia, trimethylamine, tripropylamine, tributylamine, diethylmethylamine, dipropylmethylamine, dibutylmethylamine, dipropylbutylamine, triethanolamine, tripropanolamine, tributanolamine, etc., may be used.

In synthesizing the present polymer, the composition of the polymerizable monomers is designed to be a preferable monomer composition as described above. The present water dispersible polymer may also be prepared while adding one or more types of polymer selected from the group consisting of polyacrylic acid esters, styrene-acrylic acid copolymers, polystyrenes, polyesters, polyamides, polyimides, silicon-containing polymers, and sulfur-containing polymers so that such polymers will be components.

The water dispersible polymer of the invention described above is preferably used as a polymer for dispersing a pigment, used in an ink composition for ink jet recording, in water. The water dispersible polymer may take any of the abovementioned forms. The preferable form is a copolymer of monomers, mainly comprising a carboxylic-group-containing monomer and an acrylate and/or methacrylate, having a styrene-equivalent number average molecular weight as determined by gel permeation chromatography of no less than 5000 and no more than 200000, and having any of the following characteristics of (a) to (e) below.

(a) the water dispersible polymer is a copolymer of monomers, having benzyl acrylate and/or benzyl methacrylate and having these benzyl monomers at an amount of no less than 40 weight % and no more than 80 weight % of the total monomer weight;

(b) the water dispersible polymer is a copolymer of monomers, having an acrylate and acrylic acid at an amount of no less than 80 weight % of the total monomer weight;

(c) the water dispersible polymer is a copolymer of monomers, containing paracumylphenoxyethylene glycol acrylate at least in part;

(d) the water dispersible polymer contains sulfur (S) at an amount of no less than 1 weight % and no more than 20 weight % of the total weight thereof;

(e) the water dispersible polymer is a polymer of monomers, containing a urethane acrylate and/or a urethane methacrylate, a non-urethane acrylate and/or a non-urethane methacrylate, and acrylic acid and/or methacrylic acid at least in part, the total amount of allophanate bonds and biuret bonds with respect to the polymer solids is no more than 11.0 mmol/g, and the total amount of urethane bonds, urea bonds, allophanate bonds, and biuret bonds with respect to the polymer solids is no more than 10.0 mmol/g.

The various water-dispersible polymers of (a) to (e) above may take on the various forms described above.

(Polymer-Coated Pigment)

In the present aqueous ink composition, the abovementioned pigment preferably exists as a polymer-coated pigment (may also be referred to as "microcapsulated pigment") that is coated with a water-dispersible polymer. The polymer-coated pigment is dispersible in an aqueous medium in the form wherein the pigment is coated or surrounded by the polymer compound. This polymer-coated pigment especially preferably has a pigment mentioned below coated by the polymer compound. As the pigment, carbon black is preferable in the case of black ink, one or more types of pigment selected from the group consisting of C. I. Pigment Blue 15:1, C. I. Pigment Blue 15:3, and C. I. Pigment 15:4 is preferable in the case of cyan ink, one or more types of pigment selected from the group consisting of C. I. Pigment Red 122, C. I. Pigment Red 146, C. I. Pigment Red 169, C. I. Pigment Red 81:2, C. I. Pigment Red 176, C. I. Pigment Red 184, C. I. Pigment Red 185, C. I. Pigment Red 202, C. I. Pigment Red 208, C. I. Pigment Red 57:1, C. I. Pigment Violet 32, and C. I. Pigment Violet 19 is preferable in the case of magenta ink, and one or more types of pigment selected from the group consisting of C. I. Pigment Yellow 73, C. I. Pigment Yellow 74, C. I. Pigment Yellow 109, C. I. Pigment Yellow 110, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 180, C. I. Pigment Yellow 185, etc., is preferable in the case of yellow ink. The content of the polymer-coated pigment in the aqueous ink composition as concentration of the polymer-coated pigment is preferably in the range of no less than 2% and no more than 8% and more preferably in the range of no less than 3% and no more than 8%.

Among the water-dispersible polymers for the polymer-coated pigment, polymers, having a carboxylic-group as a hydrophilic group and wherein the monomer composition, amount of urethane bonds, etc., are controlled, exhibit excellent dispersion stability, coloration properties on regular paper, and gloss and fixing properties on glossy paper when enclosing a pigment. Though any of the above-described water-dispersible polymers is preferably used singly as the polymer coating the pigment, besides such a polymer, one type of polymer or two or more types of polymers selected from the group consisting of poly(meth)acrylic acid esters, styrene-(meth)acrylic acid copolymers, styrene-(meth)acrylic acid ester copolymers, styrene-(meth)acrylic acid ester-meth)acrylic acid copolymers, styrene-maleic acid copolymers, styrene-maleic acid ester-maleic acid copolymers, styrene-itaconic acid copolymers, styrene-itaconic acid ester-itaconic acid copolymers, styrene-(meth)acrylic acid ester-itaconic acid copolymers, styrene-fumaric acid copolymers, styrene-fumaric acid ester-fumaric acid copolymers, and other vinyl polymers, polyesters, polyamides, polyimides, polyurethanes, amino-based polymers, silicon-containing polymers, sulfur-containing polymers, fluorine-containing-polymers, epoxy resins, etc., may be used in combination.

The average particle diameter of the polymer-coated pigment is preferably no more than 400 nm and more preferably no more than 200 nm. This is because the dispersion stability decreases significantly when the particle diameter exceeds 200 nm. The particle diameter is even more preferably no more than 150 nm and most preferably no more than 100 nm. Also, the particle diameter is preferably no less than 30 nm. This is because the dispersion stability decreases significantly when the particle diameter is less than 30 nm. More preferably, the particle diameter is no less than 50 nm. Though the average particle diameter of the polymer-coated pigment can be measured by a light scattering method, the average particle diameter may also be measured employing another method by which measurements can be made with the same accuracy and precision. In measuring the average particle diameter by a light scattering method, for example, the Zetasizer 3000HS (made by Malvern Instruments, Inc. (UK)) may be used.

(Polymer-Coated Pigment Production Method)

The polymer-coated pigment is produced by a known physical-mechanical method or chemical method. Specifically, a phase separation method (coacervation), in-liquid drying method (interface precipitation method), spray drying method, pan coating method, in-liquid curing coating method, interface polymerization method, in situ method, ultrasonic method, etc., may be used without restrictions in particular. As the polymer-coated pigment of the present ink composition, an anionic polymer-coated pigment described in Japanese Published Unexamined Patent Application No. H9-151342 may be used. The polymer-coated pigment may also be obtained by the method described in Japanese Published Unexamined Patent Application No. H10-316909.

(Polymer Coating of Pigment by Polymerization)

The polymer-coated pigment may, for example, be obtained by polymerizing the monomers of this invention's water-dispersible polymer by emulsion polymerization under the presence of a pigment. That is, a polymerization reaction is carried out under predetermined conditions upon adding polymerizable monomers, a polymerization initiator, and, where necessary, a chain transfer agent to a system in which the pigment is dispersed. The pigment dispersion system may be arranged using a dispersant having a polymerizable group that can be copolymerized with another monomer. Specifically, the pigment, water, and where necessary, a polymerizable surfactant are placed in a reaction vessel, equipped with an ultrasonic generator, a stirrer, and a temperature regulator, and a pulverization process is carried out by irradiating ultrasonic waves over a predetermined amount of time. Besides using an ultrasonic dispersion method using an ultrasonic generator, a dispersion method using a ball mill, roll mill, Eiger mill or other generally-used dispersion machine or a dispersion method using a high-speed mixer, beads mill, sand mill, or roll mill, etc., may be used. The polymer-coated pigment can then be obtained favorably by adding monomers and the polymerization initiator and carrying out the polymerization reaction under a predetermined polymerization temperature. The abovementioned chain transfer agent may be added to the reaction vessel at this point.

(Polymer Coating of Pigment by a Phase Inversion Emulsification Method)

A phase inversion emulsification method may be cited as a favorable method for producing the polymer-coated pigment. By lowering the hydrophilicity of the polymer, the adsorption onto the surface of the pigment, which is high in hydrophobicity, is improved and the pigment becomes less likely to be attacked by surfactants and solvents that are normally used in ink jets and is thereby improved in stability. While the stability of the ink is not obtained with normal dispersion in a medium using an acrylic styrene-based polymer, the stability of the ink is improved and coloration on regular paper is improved by using a phase inversion emulsification method with this invention's water dispersible polymer The water dispersible polymer that is used in the phase inversion emulsification method is preferably synthesized by solution polymerization. It is also preferable for the polymer to be synthesized by liquid polymerization using a radical polymerization initiator. The polymer dispersion obtained by solution polymerization may be used as it is in a pigment dispersion step. As an example of the phase inversion emulsification method, a method comprising: a pigment dispersion step of preparing a mixed liquid containing a polymer, a pigment, an organic solvent, and an excess amount of water with respect to the organic solvent and dispersing the abovementioned pigment, with at least a part of the abovementioned polymer enclosing the abovementioned pigment, in the aqueous phase of the abovementioned mixed liquid; and a composition preparation step of preparing an aqueous ink composition using the polymer and the pigment, existing in the abovementioned aqueous phase, along with at least a part of the abovementioned aqueous phase or in a state of separation from the abovementioned aqueous phase; may be cited.

The pigment dispersion process may, for example, be carried out as follows. That is, a pigment dispersion is prepared by dispersing the pigment in the organic solvent, a polymer dispersion is prepared by dispersing or dissolving the polymer in water, and by mixing the pigment dispersion and the polymer dispersion, a state, wherein the polymer is made to exist in a biased manner close to the surface of the pigment and thereby coat the pigment, is formed in the aqueous phase to disperse the pigment. Also, by preparing the organic solvent dispersion containing the pigment and the polymer (and containing, where suitable, any of a neutralizer, water, and surfactant or a combination of these) and mixing this with a large amount of water (preferably an excess amount with respect to the organic solvent), phase inversion emulsification of the pigment and the polymer from the organic solvent phase to the aqueous phase can be achieved to thereby coat (enclose) the pigment with (in) the polymer.

Though the organic solvent that makes up the abovementioned pigment dispersion is not restricted in particular, an organic solvent of low boiling point is preferable in view of the ease of distilling off of the organic solvent. Ketone organic solvents, such as acetone, methyl ethyl ketone, etc., ester organic solvents, such as ethyl acetate, etc, alcohol organic solvents, such as ethanol, isopropyl alcohol, etc., aromatic hydrocarbon organic solvent, such as benzene, etc., can be cited as examples. Besides the use of ultrasonic waves, a high-speed mixer, sand mill, beads mill, or roll mill, etc., may be selected as suited for use in dispersion of the pigment in the solvent.

Though as mentioned above, among various inorganic alkalis and various organic amines, an inorganic alkali is preferably used for the dissolution or dispersion of a polymer with a carboxylic group in water.

The pigment dispersion process in the above-described phase inversion emulsification method is preferably carried out with a device that performs mixing and stirring while applying a suitable shear so that the polymer and the pigment will contact each other and the polymer can become attached to the surface of the pigment. Besides removing the solvent from the mixed liquid of the pigment dispersion and the aqueous polymer solution by a method such as heating, etc., a method, such as centrifugation, water washing, ultrafiltration, pressurized filtration, etc., may be selected as suited for separating the polymer and the pigment from the aqueous phase.

This invention thus provides an aqueous ink composition production method comprising: a step of synthesizing a water dispersible polymer (which is preferably a solution polymerization step, more preferably using a radical polymerization initiator), a pigment dispersion step of preparing a mixed liquid containing the abovementioned polymer, a pigment, an organic solvent, and an excess amount of water with respect to the organic solvent and dispersing the abovementioned pigment, with at least a part of the abovementioned polymer being coated on the abovementioned pigment, in the aqueous phase of the abovementioned mixed liquid; and a composition preparation step of preparing an aqueous ink composition using the polymer and the pigment, existing in the abovementioned aqueous phase, along with at least a part of the abovementioned aqueous phase or in a state of separation from the abovementioned aqueous phase.

With the present ink composition, besides being dispersed by the present polymer, the pigment may also be dispersed by another polymer dispersant. Examples of the polymer dispersant include acrylic-based resins, such as polyvinyl alcohols, polyvinylpyrrolidones, polyacrylic acids, acrylic acid-acrylonitrile copolymers, potassium acrylate-acrylonitrile copolymers, vinyl acetate-acrylic acid ester copolymers, acrylic acid-acrylic acid ester copolymers, etc., styrene-acrylic resins, such as styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, etc., styrene-maleic acid copolymers, styrene-maleic anhydride copolymers, vinyl-naphthalene-acrylic acid copolymers, vinyl naphthalene-maleic acid copolymers, vinyl-acetate-based copolymers, such as vinyl acetate-ethylene copolymers, vinyl acetate-fatty acid vinyl ethylene copolymers, vinyl acetate-maleic acid ester copolymers, vinyl acetate-crotonic acid copolymers, vinyl acetate-acrylic acid copolymers, and salts of such resins. Preferably, an acrylic-based resin, such as a polyvinylpyrrolidone, polyacrylic acid, acrylic acid-acrylonitrile copolymer, potassium acrylate-acrylonitrile copolymer, vinyl acetate-acrylic acid ester copolymer, acrylic acid-acrylic acid ester copolymer, etc., is used. The amount added of such a dispersant with respect to the pigment is preferably in the range of no less than 1% and no more than 50% and more preferably in the range of no less than 2% and no more than 30%.

The dispersion of the pigment by the water dispersible polymer or a dispersant containing the water dispersible polymer is carried out by subjecting a colorant, the abovementioned dispersant, water, and a water-soluble organic solvent to dispersion by a ball mill, sand mill, attritor, roll mill, agitator mill, Henschel mixer, colloid mill, ultrasonic homogenizer, jet mill, Angstrom mill, or other suitable dispersion machine.

Also, with this invention, polymer microparticles may be added to improve the fixing property. Preferably, an emulsion, containing polymer microparticles, is contained. In this case, the fixing property is improved by the minimum film forming temperature (MFT) of the polymer microparticles being no more than room temperature. Also, even if the glass transition point is no less than room temperature, the apparent film forming temperature may be lowered using a film-forming aid. Furthermore, in regard to the method of producing the polymer microparticles, micro-phase separation structures, wherein hard segments and soft segments are separated from each other, can be introduced by polymerization using a long-chain macromer to improve the fixing property.

Such polymer microparticles can be obtained by emulsion polymerization of a known vinyl monomer. Styrene, tetrahydrofurfuryl acrylate, or butyl methacrylate may be used as the vinyl monomer, and examples of monomers that can be used besides these include (α, 2, 3, and 4)-alkylstyrenes, (α, 2, 3, and 4)-alkoxystyrenes, 3,4-dimethylstyrenes, α-phenylstyrene, divinylbenzene, vinylnaphthalene, dimethylamino (meth)acrylate, dimethylaminoethyl(meth)acrylate, dimethylaminopropylacrylamide, N,N-dimethylaminoethyl acrylate, acryloyl morpholine, N,N-dimethylacrylamide, N-isopropylacrylamide, N,N-diethylacrylamide, methyl (meth)acrylate, ethyl(meth)acrylate, propyl(meth)acrylate, ethylhexyl (meth)acrylate, other alkyl(meth)acrylates, (meth)acrylates of diethylene glycols or polyethylene glycols with an ethoxy group, propoxy group, or butoxy group, cyclohexyl (meth)acrylate, benzyl(meth)acrylate, phenoxyethyl (meth)acrylate, isobornyl (meth)acrylate, hydroxyalkyl (meth)acrylates, other fluorine-containing, chlorine-containing, and silicon-containing (meth)acrylates, (meth) acrylamide, and maleic acid amide, and in the case where a crosslinked structure is to be introduced in addition to a single functional group of (meth)acrylic acid, (mono, di, tri, tetra, or poly)ethylene glycol di(meth)acrylate, methacrylates of 1,4-butanediol, 1,5-pentanediol, 1,6-hexanediol, 1,8-octanediol, and 1,10-decanediol, etc., trimethylolpropane tri(meth)acrylate, glycerin (di, tri)(meth)acrylate, di(meth)acrylates of the ethylene oxide adducts of bisphenol A or F, neopentyl glycol di(meth)acrylate, pentaerythritol tetra(meth)acrylate, dipentaerythritol hexa(meth)acrylate and other compounds with an acrylic group or methacrylic group may be used.

Such polymer microparticles can be synthesized by a known emulsion polymerization method. Sodium lauryl sulfate or potassium lauryl sulfate may be used as the emulsifier in the synthesis of the polymer microparticles, and besides these, a surfactant that is a sulfate salt of an alkyl group, branched alkyl group, or alkylphenyl group, having a stearyl group, nonyl group, octyl group, etc., or a phosphoric acid salt or boric acid salt surfactant, anionic surfactant, nonionic surfactant, or amphoteric surfactant, etc., may be used.

Potassium persulfate or ammonium persulfate may be used as the polymerization initiator, and besides these, a general initiator used in radical polymerization, such as hydrogen persulfate, azobisisobutyronitrile, azobisisovaleronitrile, benzoyl peroxide, dibutyl peroxide, peracetic acid, cumene hydroperoxide, t-butyl hydroxyperoxide, para-menthane hydroxyperoxide, etc., may be used, and preferably the initiator is soluble in water since the polymerization reaction is carried out in water.

Also, t-dodecyl mercaptan may be used as the chain transfer agent, as well as a generally used chain transfer agent, such as n-dodecyl mercaptan or n-octyl mercaptan, a xanthogen, such as dimethyl xanthogen disulfide or diisobutyl xanthogen disulfide, or dipentene, indene, 1,4-cyclohexadiene, dihydrofuran, xanthene, etc.

Also, core-shell type polymer microparticles, in which the core and shell differ in structure, may be used. It is preferable to make the minimum film formation temperature (MFT) of such polymer microparticles no more than room temperature by design or by use of an MFT lowering agent (film-forming aid). Also, depending on the reaction conditions, etc., the abovementioned additives do not have to be used. A suitable selection can be made, for example, in a case where a micelle-forming monomer is used, a micelle-forming agent is unnecessary, and a chain transfer agent also may not have to be used depending on the reaction conditions.

This invention's aqueous ink composition contains water and a water-soluble organic solvent. This water and water-soluble organic solvent form, for example, at least a part of an aqueous medium that is used for the dispersion of a pigment. Polar solvents, such as 2-pyrrolidone, N-methylpyrrolidone, ε-caprolactam, dimethyl sulfoxide, sulfolane, morpholine, N-ethyl morpholine, 1,3-dimethyl-2-imidazoline, etc., may be cited as examples of a water-soluble organic solvent, and it is preferable to select and use one or more solvents from such solvents. The content of such a polar solvent with respect to the total weight of the ink for ink jet recording is preferably 0.01 weight % to 20 weight % and more preferably 1 weight % to 10 weight %.

The present aqueous ink composition is preferably used as ink for normal writing utensils as well as for ink jet recording. In use as an ink composition for ink jet recording, various types of additives, such as a humectant, dissolution aid, penetration controlling agent, viscosity modifier, pH adjustor, antioxidant, preservative, antifungal agent, corrosion inhibitor, chelate for capturing metal ions that affect dispersion, etc., may be added for the purpose of securing shelf stability, stable discharge from an ink head, improvement in regard to clogging, or prevention of ink degradation.

In using the present aqueous ink composition as ink jet recording ink, it is preferable for a humectant, comprising a high-boiling-point water-soluble organic solvent, to be contained for the purpose of providing water retention and wetting properties. A high-boiling-point water-soluble organic solvent may be used as a wetting agent, with examples including polyvalent alcohols, such as ethylene glycol, diethylene glycol, triethylene glycol, polyethylene glycol (preferably of a molecular weight of no more than 2000), propylene glycol, dipropylene glycol, polypropylene glycol, butylene glycol, 1,3-propylene glycol, isopropylene glycol, isobutylene glycol, 1,4-butanediol, 1,3-butanediol, 1,5-pentanediol, 1,6-hexanediol, 1,2,6-hexanetriol, thioglycol, hexylene glycol, glycerin, meso-erythritol, pentaerythritol, trimethylolpropane, etc. Glycerin and trimethylolpropane may be used favorably. One type of such a high-boiling-point water-soluble organic solvent may be used or two or more types may be mixed and used. The content of such a high-boiling-point water-soluble organic solvent with respect to the total weight of the ink jet recording ink is preferably 0.01 weight % to 20 weight % and more preferably 5 weight % to 20 weight %.

Also in this invention, various types of sugars may be used to restrain the drying and clogging of ink at the front face of a nozzle. Monosaccharides and polysaccharides may be used, with examples including glucose, mannose, fructose, ribose, xylose, arabinose, lactose, galactose, aldonic acids, glucitose, maltose, cellobiose, sucrose, trehalose, maltotriose, alginic acid and salts thereof, cyclodextrins, and celluloses. The added amount thereof is preferably no less than 0.05% and no more than 30%. At an added amount of less than 0.05%, the effect of recovery from a clogging phenomenon, wherein the ink dries and clogs the front end of a head, is low, and at an excess of 30%, the viscosity of the ink rises and appropriate printing cannot be performed. The added amount of a general sugar, that is, a monosaccharide or polysaccharide, such as glucose, mannose, fructose, ribose, xylose, arabinose, lactose, galactose, aldonic acid, glucitose, maltose, cellobiose, sucrose, trehalose, maltotriose, etc., is more preferably 3 to 20%. In the case of alginic acid and salts thereof, cyclodextrins, and celluloses, the added amount must be set within a range that the viscosity will not become too high.

The ink composition also preferably contains a penetrating agent for the purpose of promoting the penetration of the aqueous solvent with respect to a recording medium. By the aqueous solvent penetrating rapidly into the recording medium, a recorded matter with little blurring of the image can be obtained without fail. Such a penetrating agent may be selected from among alkyl alcohols with 1 to 4 carbons, such as methanol, ethanol, etc., alkyl ethers of polyvalent alcohols (also called glycol ethers), such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, dipropylene glycol mono-n-butyl ether, etc., and straight-chain alkyl diols, such as 1,3-propanediol, 1,4-butanediol, 1,5-pentanediol, 1,6-hexanediol, 1,7-heptanediol, 1,8-octanediol, 1,2-pentanediol, 1,2-hexanediol, etc. An alkylene glycol monoalkyl ether and/or 1,2-alkylene glycol, such as mentioned above may be added to the aqueous ink composition for setting the surface tension within an appropriate range.

Among the above, an "alkyl ether, with 4 to 10 carbons, of an alkylene glycol having no more than 10 repeating units," such as ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, propylene glycol mono-t-butyl ether, propylene glycol mono-n-butyl ether, dipropylene glycol mono-n-butyl ether, etc., is preferable, and one or more compounds selected from the group consisting of diethylene glycol monobutyl ether, triethylene glycol monobutyl ether, dipropylene glycol monobutyl ether, and propylene glycol monobutyl ether is especially preferable. Di(tri)ethylene glycol monobutyl ether is even more preferable. The combined use of an 1,2-alkyldiol with 5 to 8 carbons, such as 1,2-hexanediol, 1,2-heptanediol, etc., along with or separately of such an alkyl ether of an alkylene glycol is also preferable. In the case where the 1,2-alkyldiol is 1,2-hexanediol and/or 1,2-heptanediol, the drying of the print is improved by the addition, and since even when continuous printing is performed, a previously printed part will not become transferred onto the rear surface of a subsequent medium, high-speed printing is enabled, especially in the case of ink jet recording.

The content of such penetrating agents with respect to the total weight of the ink jet recording ink is preferably no more than 30%, more preferably no more than 20%, and even more preferably no more than 10%.

In order to set the surface tension within an appropriate range, the ink preferably contains one or more types of substances selected from the group consisting of di(tri)ethylene glycol monobutyl ether, (di)propylene glycol monobutyl ether, and 1,2-alkylene glycols and the added amount of this substance is preferably no less than 0.5% and no more than 30%.

Also with this invention's ink, a surfactant may be added to further control penetration into paper, special paper, or other medium. As the surfactant to be added, a surfactant of good compatibility with this invention's ink system is preferable and that which is high in permeability and is stable among surfactants is preferable. Amphoteric surfactants, nonionic surfactants, etc., can be cited as examples. Amphoteric surfactants include lauryl dimethylaminoacetic acid betaine, 2-alkyl-N-carboxymethyl-N-hydroxyethylimidazolinium betaines, palm oil fatty acid amidopropyldimethylaminoacetic acid betaines, polyoctylpolyaminoethyl glycine, and other imidazoline derivatives. Nonionic surfactants include ether-based surfactants, such as polyoxyethylene nonylphenyl ether, polyoxyethylene octylphenyl ether, polyoxyethylene dodecylphenyl ether, polyoxyethylene alkylaryl ethers, polyoxyethylene oleyl ether, polyoxyethylene lauryl ether, polyoxyethylene alkyl ethers, polyoxyalkylene alkyl ethers (polyoxypropylene polyoxyethylene alkyl ethers), etc., ester-based surfactants, such as polyoxyethylene oleic acid, polyoxyethylene oleic acid esters, polyoxyethylene distearic acid ester, sorbitan laurate, sorbitan monostearate, sorbitan monooleate, sorbitan sesquioleate, polyoxyethylene monooleate, polyoxyethylene stearate, as well as fluorine-containing surfactants, such as fluoroalkyl esters, perfluoroalkylcarboxylic acid salts, etc.

The ink composition preferably contains one or more types of surfactant selected from the group consisting of acetylene alcohol surfactants, acetylene glycol surfactants, and silicon-based surfactants. By the addition of these surfactants, the surface tension can be adjusted to be within an appropriate range (no less than 20 mN/m and no more than 40 mN/m). By use of these surfactants, blurring on regular paper is reduced in particular and the line width on specialized paper can be adjusted to an appropriate value. The surface tension of an ink composition is preferably measured by the automatic surface tensiometer Type CBVP-A3 (made by Kyowa Interface Science Co., Ltd.) or a measuring device of equivalent precision.

An acetylene glycol surfactant is preferably used in combination with the abovementioned glycol ethers. For example, an acetylene glycol compound, expressed by the following general formula (1) may be used:

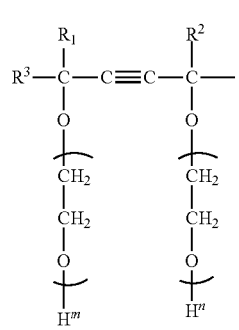

Formula (1)

In the above formula (1), m and n are numbers that respectively satisfy $0 \leq m+n \leq 50$. $R^1$, $R^2$, $R^3$, and $R^4$ respectively and independently indicate alkyl groups (preferably alkyl groups, each with no more than 6 carbons). Among the compounds expressed by the above formula (1), 2,4,7,9-tetramethyl-5-decene-4,7-diol, 3,6-dimethyl-4-octene-3,6-diol, 3,5-dimethyl-1-hexene-3-ol, etc., can be cited as being especially preferable. As compounds of the above formula (I), commercially available products that are sold as acetylene glycol surfactants may be used, with specific examples including Surfynol 104, 82, 440, 465, 485, and STG (all available from Air Products and Chemicals, Inc.) and Olfin STG and Olfin E1010 (made by Nissin Chemical Industry Co., Ltd.).

Olfin P and Olfin B (made by Air Products and Chemicals, Inc.) and Surfynol 61 (made by Nissin Chemical Industry Co., Ltd.) may be cited as specific examples of acetylene alcohol surfactants. In using an acetylene alcohol surfactant, a dissolution aid may also be used. Preferable examples of a dissolution aid include dimethyl-2-imidazolidinone, 2-pyrrolidone, and N-methyl-2-pyrrolidone. Silicon-based surfactants may also be used, with preferable specific examples including BYK-301, 302, 307, 325, 331, 341, 345, 346, 348, and 375 (made by BYK Chemie GmbH). The content of these surfactants with respect to the total weight of the ink jet recording ink is in the range of preferably no less than 0.01% an no more than 10% and more preferably no less than 0.1% and no more than 5%.

The present aqueous ink composition preferably contains one or more compounds selected from the group consisting of the abovementioned acetylene glycol surfactants, acetylene alcohol surfactants, and silicon-based surfactants and one or more compounds selected from among group consisting of di(tri)ethylene glycol monobutyl ether, (di)propylene glycol monobutyl ether, and 1,2-alkylne glycols. It is preferable for the added amount of the abovementioned one or more compounds selected from the group consisting of acetylene glycol surfactants, acetylene alcohol surfactants and silicon-based surfactants to be 0.01% to 0.5% and the added amount of the one or more compounds selected from the group consisting of di(tri)ethylene glycol monobutyl ether, (di)propylene glycol monobutyl ether, and 1,2-alkylne glycols to be no less than 1%.

Also, examples of pH adjustors, dissolution aids, and antioxidants include diethanolamine, triethanolamine, propanolamine, morpholine, and other amines and modified forms thereof, potassium hydroxide, sodium hydroxide, lithium hydroxide, and other inorganic salts, ammonium hydroxide and quaternary ammonium hydroxides (tetramethylammonium, etc.), potassium (bi)carbonate, sodium (bi)carbonate, lithium (bi)carbonate and other carbonates as well as phosphates, N-methyl-2-pyrrolidone, urea, thiourea, tetramethylurea, and other ureas, allophanate, methyl allophanate, and other allophanates, biuret, dimethylbiuret, tetramethylbiuret, and other biurets, L-ascorbic acid and salts thereof, etc. Commercially available antioxidants, ultraviolet absorbers, etc., may also be used. Examples include Ciba Geigy's Tinuvin 328, 900, 1130, 384, 292, 123, 144, 622, 770, and 292, Irgacor 252 and 153, Irganox 1010, 1076, and 1035, MD 1024, etc., as well as oxides of lanthanides.

Also, examples of viscosity modifiers include rosins, alginic acids, polyvinyl alcohols, hydroxypropylcellulose, carboxymethylcellulose, hydroxyethylcellulose, methylcellulose, polyacrylic acid salts, polyvinylpyrrolidone, arabic gum starch, etc.

Examples of preservatives include alkylisothiazolones, chloroalkylisothiazolones, benzisothiazolone, bromonitroalcohols, oxazolidine compounds and/or chloroxylenol, etc., examples of chelating agents include ethylenediamine acetic acid salts, nitrilotriacetic acid salts, etc., and examples of corrosion inhibitors include dicyclohexylammonium nitrate, benzotriazole, etc.

As preservatives, products containing octylisothiazolone, which is an alkylisothiazolone, as an effective component are commercially available (for example, NS-800H, NS800G, and NS-800P, all made by Nagase ChemteX Corp.). In regard to chloroalkylisothiazolones, products containing chloromethylisothiazolone as an effective component are commercially available (for example, NS-500W, NS-80D, NS-CG, NS-TM, and NS-RS, all made by Nagase ChemteX Corp.). Products containing benzisothiazolone as an effective component are also commercially available (for example, Proxel BDN, Proxel BD20, Proxel GXL, Proxel LV, and Proxel TN, all made by Zeneca Inc. (UK, and Denicide BIT and Denicide NIPA, made by Nagase ChemteX Corp.). Products containing a bromonitroalcohol as an effective component are also commercially available (for example, Bronopol, Miacide BT, and Miacide AS, all made by Nagase ChemteX Corp.). Products containing chloroxylenol as an effective component are also commercially available (for example, PCMX, made by Nagase ChemteX Corp.).

Also, as products having oxazolidine compounds or mixtures or modified forms of such components as effective components are commercially available according to application (for example, NS-BP, Denicide BIT-20N, Denicide SPB, Saniset HP, Microstat S520, Saniset SK2, Denicide NS-100, Denicide BF-1, Denicide C3H, Saniset 161, Denicide CSA, Denicide CST, Denicide C3, Denicide OMP, Denicide XR-6, Denicide NM, Moldenize N760, Denisat P4, Denisat P-8, and Denisat CHR, all made by Nagase ChemteX Corp.). Among these, products having oxazolidine compounds as effective components, products having chloroisomethylthiazolone as an effective component, and products having benzisothiazolone as an effective component are high in effects in aqueous ink. These preservatives are preferably used not in the form of a solitary component but in the form of composite components, wherein two or more compounds that are not very similar in structure are used, since resistive bacteria can then be restrained.

As chelating agents, ethylenediamine acetic acid salts, such as the free acids, disodium salts, trisodium salts, and tetrasodium salts of ethylenediamine diacetic acid and ethylenediamine tetraacetic acid are cited. Among these disodium salts, trisodium salts, and tetrasodium salts are preferable. Also, though nitrilotriacetic acid salts include the free acid, monosodium salt, disodium salt, and trisodium salt of nitrilotriacetic acid, the monosodium salt, disodium salt, and trisodium salt are preferable. Lithium salts, potassium salts, ammonium salts, and triethanolamine salts are also effective for aqueous ink. Such ethylenediamine acetic acid salts, nitrilotriacetic acid salts, etc., provide the effect of preventing metal ions that exist in an ink passage of an ink cartridge or head from causing coagulation and alteration of dispersions of molecular colorants and polymer microparticles.

The present invention also provides a recording method of depositing the present ink composition onto a recording medium and thereby printing onto the recording. With the present recording method, recorded matters of excellent printing quality are provided. In particular, either or both of low blurring and high coloration properties on regular paper and adequate coloration and fixing properties on specialized paper are provided. Furthermore, the recorded matters that are obtained are provided with robustness of image, which is a characteristic of recorded matters using pigment ink. Though various printing methods, such as ink jet recording, recording method by a pen or other writing utensil, etc., may be cited as recording methods, the recording method using the present ink composition is preferably an ink jet recording method in particular, more preferably an ink jet recording method, wherein ink is discharged by vibration of an electrostrictive element based on electrical signals, and even more preferably an ink jet recording method using a piezo element. Also, since a recorded matter printed by an ink jet recording method using the present ink composition is provided with both excellent printing quality and image robustness, it is excellent in long-term stability and favorable as a recorded matter of a photograph or other image.

Example 1

Specific examples of this invention shall now be described. The present invention is not limited to just these specific examples.

(Production of Dispersions A1 to A4)

First, dispersion A1 uses Monarch 880 (made by Cabot Corp.), which is a carbon black. After performing nitrogen replacement of the interior of a reaction vessel, equipped with a stirrer, thermometer, reflux tube, and dripping funnel, 20 parts of styrene, 5 parts of 2-ethylhexyl methacrylate, 15 parts of butyl methacrylate, 10 parts of lauryl methacrylate, 2 parts of methacrylic acid, and 0.3 parts of t-dodecyl mercaptan were placed in the reaction vessel and heated to 70° C. Then 150 parts of styrene, 15 parts of acrylic acid, 50 parts of butyl methacrylate, 1 part of t-dodecyl mercaptan, 20 parts of methyl ethyl ketone, and 1 part of azobisisobutyronitrile, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%.

Upon taking a part of the abovementioned dispersion polymer and subjecting it to gel permeation chromatography (GPC) using the L7100 System made by Hitachi, Ltd., the styrene-equivalent molecular weight as measured using THF as the solvent was found to be 50000. The dispersion (Mw/Mn) of the molecular weight was 3.2.

40 parts of the abovementioned dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 μm membrane filter was carried out, thereby preparing dispersion A1, having a solids content (dispersion polymer and carbon black) of 20%.

Dispersions A2 to A4 were obtained by the same method as the above. Each dispersion was prepared so that the weight ratio of the dispersion polymer to the pigment will be 20:80. For dispersion A2, Pigment Blue 15:3 (copper phthalocyanine pigment; made by Clariant, Ltd.) was used. For dispersion A3, Pigment Red 122 (dimethylquinacridone pigment; made by Clariant, Ltd.) was used. For dispersion A4, Pigment Yellow 180 (diketopyrrolopyrrole; made by Clariant, Ltd.) was used.

(Production of dispersions A5 to A8)

Dispersions A5 to A8 were prepared in the same manner as dispersions A1 to A4. For dispersion A5, Leben C (made by Columbian Carbon Ltd.), which is a carbon black, was used, and for dispersion A6, Pigment Blue 15:4 (copper phthalocyanine pigment; made by Clariant, Ltd.) was used. For dispersion A7, Pigment Violet 19 (quinacridone pigment; made by Clariant, Ltd.) was used. For dispersion A8, Pigment Yellow 74 (condensed azo pigment; made by Clariant, Ltd.) was used.

(Production of Polymer Particles)

100 parts of ion-exchanged water were placed in a reaction vessel, equipped with a dripping device, thermometer, water-cooled reflux condenser, and a stirrer, and while stirring at 70° C. under a nitrogen atmosphere, 0.2 parts of potassium persulfate were added as a polymerization initiator. A monomer solution, with which 0.05 parts of sodium lauryl sulfate, 4 parts of glycidoxy acrylate, 25 parts of benzyl methacrylate, 6 parts of tetrahydrofurfuryl acrylate, 5 parts of butyl methacrylate, and 0.02 parts of t-dodecyl mercaptan were placed in 7 parts of ion-exchanged water, was then dripped in and reacted at 70° C. to prepare a primary substance. 2 parts of a 10% ammonium persulfate solution were then added to the primary substance, stirring was performed, and then after adding a reaction solution, comprising 30 parts of ion-exchanged water, 0.2 parts of potassium lauryl sulfate, 30 parts of styrene, 25 parts of butyl methacrylate, 6 parts of butyl acrylate, 2 parts of acrylic add, 1 part of 1,6-hexanediol dimethacrylate, and 0.5 parts of t-dodecyl mercaptan, while stirring and thereby carrying out a polymerization reaction, the pH was adjusted to 8 to 8.5 by neutralization by sodium hydroxide and filtration through a 0.3 μm filter was carried out to prepare a 30% aqueous solution of polymer microparticles as emulsion A.

(Preparation of Ink Jet-Inks)

Examples of compositions that are favorable as ink jet recording ink are indicated below as specific examples of aqueous ink. The added amount of dispersion is indicated with the amount thereof (solids concentration: total amount of pigment and dispersion polymer) converted to weight. The particle diameter of a pigment is indicated in units of nm in < >. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in each of the Examples.

The respective ink compositions are shown in Table 1.

TABLE 1

Ink compositions

| | Production Examples | | | | | | | |
|---|---|---|---|---|---|---|---|---|
| | A1 | A2 | A3 | A4 | A5 | A6 | A7 | A8 |
| Dispersion A1 | 7.5 | — | — | — | — | — | — | — |
| Dispersion A2 | — | 5.0 | — | — | — | — | — | — |
| Dispersion A3 | — | — | 6.5 | — | — | — | — | — |
| Dispersion A4 | — | — | — | 7.0 | — | — | — | — |
| Dispersion A5 | — | — | — | — | 6.0 | — | — | — |
| Dispersion A6 | — | — | — | — | — | 5.0 | — | — |
| Dispersion A7 | — | — | — | — | — | — | 7.0 | — |
| Dispersion A8 | — | — | — | — | — | — | — | 8.0 |
| Emulsion A | — | — | — | — | 10.0 | 10.0 | 10.0 | 10.0 |
| DEGmBE | — | 10.0 | — | — | 10.0 | — | 8.0 | 10.0 |
| TEGmBE | 5.0 | — | — | 3.0 | — | 6.0 | — | — |
| PGmBE | — | — | — | — | — | — | — | 2.0 |
| DPGmBE | — | — | — | — | 2.0 | — | — | — |
| 1,2-hexanediol | — | — | 4.0 | — | — | — | — | — |
| 1,2-pentanediol | — | — | — | 5.0 | — | — | — | — |
| Glycerin | 17.0 | 17.0 | 16.0 | 15.0 | 14.0 | 15.0 | 15.0 | 9.0 |
| Triethylene glycol | — | — | 7.0 | — | 2.0 | — | — | 5.0 |
| Tetraethylene glycol | — | — | 1.5 | 9.0 | — | — | — | — |
| Dipropylene glycol | — | 5.0 | — | — | — | — | — | — |
| Trimethylolpropane | — | — | — | 2.0 | — | 1.0 | 2.0 | — |
| 2-pyrrolidone | 5.0 | — | 2.0 | 2.0 | — | 2.0 | — | — |
| Olfin E1010 | 1.0 | 1.2 | — | — | — | 1.0 | 1.0 | — |
| Olfin STG | — | — | 0.5 | — | — | — | — | 1.0 |
| Surfynol 61 | — | — | — | 0.5 | — | — | 0.5 | — |
| Triethanolamine | 0.8 | 0.9 | 1.0 | 0.7 | 0.9 | 0.9 | — | 0.9 |
| Ion-exchanged water | Residual quantity | Residual quantity | Residual quantity | Residual quantity | Residual quantity | Residual quantity | Residual quantity | Residual quantity |

In Table 1, the abbreviations indicate the following.
TEGmBE: triethylene glycol monobutyl ether
Olfin E10110 (acetylene glycol surfactant, made by Nissin Chemical Industry Co., Ltd.)
DEGmBE: diethylene glycol monobutyl ether
Olfin STG (acetylene glycol surfactant, made by Nissin Chemical Industry Co., Ltd.)
Surfynol 61 (acetylene alcohol surfactant, made by Air Products and Chemicals, Inc. (USA))
DPGmBE: dipropylene glycol monobutyl ether
PGmBE: propylene glycol monobutyl ether (Evaluation of Dispersion Stability)

Table 2 shows the percentage change in viscosity upon leaving for 30 days at 60° C. for each of the aqueous inks prepared by the above-described methods. Results are shown for the inks of Production Examples A1 to A8, and for variations of Production Example A1, in which the polymer synthesis method (synthesis time and amount of radical polymerization initiator) was varied to vary the respective values of molecular weight and the dispersion Mw/Mn, as well as for variations of Production Example A1, in which the particle diameter of the pigment was varied. The particle diameter was measured using the Zetasizer 3000HS (made by Malvern Instruments, Inc. (UK)). For the percentage change in viscosity, viscosity values were measured at an angle of 60° using the AMVn, made by Anton Paar GmbH, and 1−(value after 30 days)/(initial value) is indicated in the form of percentage (%). The OD values were measured using the Gretag Macbeth Spectroscan (made by Gretag Corp.).

TABLE 2

Measurement results of percentage change in viscosity

| Production Example | Molecular weight × $10^4$ | Mw/Mn | Particle diameter (nm) | Percentage change in viscosity (%) |
|---|---|---|---|---|
| A1 | 0.51 | 3.5 | 65 | 1.5 |
|  | 1.12 | 3.5 | 60 | 1.3 |
|  | 3.10 | 3.5 | 65 | 1.0 |
|  | 5.23 | 3.5 | 60 | 1.0 |
|  | 10.21 | 1.5 | 60 | 1.3 |
|  | 10.21 | 2.0 | 60 | 1.0 |
|  | 10.21 | 3.0 | 60 | 1.0 |
|  | 10.21 | 3.0 | 15 | 10.8 |
|  | 10.21 | 3.0 | 20 | 1.0 |
|  | 10.21 | 5.0 | 300 | 1.9 |
|  | 10.21 | 10.0 | 60 | 1.0 |
|  | 10.21 | 11.0 | 60 | 1.3 |
|  | 20.13 | 3.5 | 60 | 2.6 |
|  | 25.20 | 3.5 | 60 | 3.8 |
|  | 30.11 | 3.5 | 60 | 8.6 |
| A2 | 5.12 | 3.0 | 65 | 1.0 |
| A3 | 5.56 | 3.0 | 70 | 1.0 |
| A4 | 5.32 | 3.5 | 65 | 1.0 |
| A5 | 7.15 | 3.5 | 65 | 1.0 |
| A6 | 5.28 | 3.0 | 65 | 1.0 |
| A7 | 5.23 | 3.0 | 65 | 1.0 |
| A8 | 5.12 | 3.5 | 65 | 1.0 |

The results of Table 2 show that the storage stability is excellent when the colorant is a pigment with a particle diameter as determined by the light scattering method of no less than 20 nm and no more than 80 nm, and the polymer thereof has a styrene-equivalent molecular weight as determined by gel permeation chromatography (GPC) of no less than 20000 and no more than 200000 and a dispersion Mw/Mn of 2 to 10, preferably 2 to 5, and more preferably 2.5 to 4, as in the present invention. In regard to the relationships concerning the variations of the respective values of the molecular weight, the dispersion Mw/Mn, and the particle diameter of the pigment, the same trends apply to the Production Examples A2 to A8.

(Evaluation of OD on Regular Papers)

Table 3 shows the evaluation results of printing quality on regular papers. In Production Example A1, the polymerization conditions (synthesis time and amount of radical polymerization initiator) of the polymer were adjusted to prepare dispersions with different molecular weights, and these dispersions are compared in the Table. The papers used in these evaluations are the commercially available papers, Xerox 4024 paper (made by Xerox USA Corp.), Xerox 10 paper (made by Fuji Xerox Co., Ltd.), Ricopy 6200 paper (made by Ricoh Co., Ltd.), and Epson EPP paper (made by Seiko Epson Co., Ltd.). The OD values were measured by the same method as that of Table 2.

TABLE 3

OD on regular papers according to polymer molecular weight and pigment concentration

| | Polymer molecular weight × $10^4$ | | | | | |
|---|---|---|---|---|---|---|
| | 0.51 | 3.10 | 5.23 | 10.21 | 20.13 | 30.11 |
| Xerox4024 | 1.41 | 1.40 | 1.40 | 1.43 | 1.35 | 1.21 |
| Xerox10 | 1.40 | 1.40 | 1.38 | 1.40 | 1.34 | 1.18 |

TABLE 3-continued

OD on regular papers according to polymer molecular weight and pigment concentration

| | Polymer molecular weight × $10^4$ | | | | | |
|---|---|---|---|---|---|---|
| | 0.51 | 3.10 | 5.23 | 10.21 | 20.13 | 30.11 |
| Ricopy6200 | 1.34 | 1.35 | 1.35 | 1.38 | 1.30 | 1.16 |
| EPP | 1.43 | 1.43 | 1.43 | 1.44 | 1.41 | 1.22 |

As is clear from the results of Table 3, a high OD is realized by the polymer having a styrene-equivalent molecular weight as determined by gel permeation chromatography (GPC) of no more than 200000 as in the present invention. In regard to the relationships of dispersions using polymers of different molecular weights, the same trends apply to Production Examples A2 to A8.

(Evaluation of Pigment Concentration and OD)

Table 4 shows the OD values when the pigment concentration is varied with the inks of Production Examples A1 to 4. The papers used in these evaluations are the commercially available papers, Xerox 4024 paper (made by Xerox USA Corp.) and Xerox 10 paper (made by Fuji Xerox Co., Ltd.). The OD values were measured by the same method as that of Table 2.

TABLE 4

OD upon variation of pigment concentration

| | Pigment concentration (%) | Xerox 4024 | Xerox 10 |
|---|---|---|---|
| Production Example A1 | 8.0 | 1.42 | 1.42 |
|  | 7.5 | 1.40 | 1.40 |
|  | 4.0 | 1.22 | 1.21 |
|  | 3.5 | 1.09 | 1.10 |
| Production Example A2 | 5.5 | 1.35 | 1.34 |
|  | 5.0 | 1.33 | 1.33 |
|  | 4.0 | 1.20 | 1.21 |
|  | 3.5 | 1.10 | 1.09 |
| Production Example A3 | 7.0 | 1.35 | 1.36 |
|  | 6.5 | 1.32 | 1.32 |
|  | 4.0 | 1.21 | 1.20 |
|  | 3.5 | 1.10 | 1.10 |
| Production Example A4 | 8.0 | 1.40 | 1.41 |
|  | 7.0 | 1.38 | 1.39 |
|  | 4.0 | 1.22 | 1.21 |
|  | 3.5 | 1.11 | 1.10 |

As is clear from the results of Table 4, favorable OD values are obtained when the pigment concentration is no less than 4%.

(Evaluation of Fixing Property and OD on Specialized Paper)

In Production Example A1, the polymerization conditions (synthesis time and amount of radical polymerization initiator) of the polymer were adjusted to prepare dispersions with polymers of different molecular weights. The results of evaluation of these dispersions in the fixing properties and OD values on specialized paper are shown in Table 5. The OD values were measured by the same method as that of Table 2. The fixing property was evaluated using specialized paper (PM photo paper) and observing the rubbing off of ink when a printed surface and a rear surface are overlapped with a load of 300 g and moved at a speed of 1 m/s. In Table 5, A indicates that there was no rub-off whatsoever, B indicates that there was slight rub-off, C indicates that there was rub-off and transfer onto the rear surface, and D indicates that there was considerable rub-off and transfer onto the rear surface.

TABLE 5

Fixing property and OD on specialized paper

| | Molecular weight × $10^4$ | | | | | |
|---|---|---|---|---|---|---|
| | 0.51 | 3.10 | 5.23 | 10.21 | 20.13 | 30.11 |
| OD | 1.8 | 2.0 | 2.4 | 2.5 | 2.4 | 1.8 |
| Resistance to rubbing | C | B | A | A | A | C |

As is clear from the results of Table 5, the fixing property on specialized paper is improved and a high OD is realized by the polymer having a styrene-equivalent molecular weight as determined by gel permeation chromatography (GPC) of no less than 20000 and no more than 200000, as in the present invention. In regard to the relationships of dispersions using polymers of different molecular weights, the same trends apply to Production Examples A2 to A8. The Production Examples A5 to A8, with which polymer microparticles are added, are better in fixing property than Production Examples A1 to A4.

(Evaluation of Discharge Stability)

Table 6 shows the discharge stability evaluation results for the inks of Production Examples A1 to A8 and for variations of Production Example A1, wherein the composition was varied to vary the surface tension. The surface tension was increased by decreasing the added amounts of Olfin E1010, Olfin STG, Surfynol 61, DEGmBE, TEGmBE, PGmBE, and DPGmBE of Table 1. The surface tension was lowered by the use of the fluorine-based surfactant Futagent 251 (made by Neos Corp.). Surface tension measurements were made with the automatic surface tensiometer Type CBVP-A3 (made by Kyowa Interface Science Co., Ltd.). For evaluation of the discharge stability, the ink jet printer EM-930C, made by Seiko Epson Co., Ltd., was used to perform continuous printing on 100 pages of A4-size Xerox P paper at 2000 letters/page of Microsoft Word MS Ming style characters of style standard size 10. A indicates that no print distortions occurred, B indicates that print distortions occurred at less than 10 locations, C indicates that print distortions occurred at no less than 10 locations but less than 100, and D indicates that print distortions occurred at no less than 100 locations.

TABLE 6

Evaluation results of discharge stability

| Production Example | Surface tension | Molecular weight × $10^4$ | Discharge stability |
|---|---|---|---|
| A1 | 19 | 5.23 | D |
| | 20 | 5.23 | B |
| | 30 | 0.51 | B |
| | 30 | 5.23 | A |
| | 30 | 30.11 | B |
| | 41 | 5.23 | C |
| A2 | 30 | 5.12 | A |
| A3 | 31 | 5.56 | A |
| A4 | 32 | 5.32 | A |
| A5 | 30 | 7.15 | A |
| A6 | 29 | 5.28 | A |
| A7 | 30 | 5.23 | A |
| A8 | 31 | 5.12 | A |

As can be understood from the results of Table 6, the discharge stability is improved by the polymer having a styrene-equivalent molecular weight as determined by gel permeation chromatography (GPC) of no less than 20000 and no more than 200000 and a surface tension of no less than 20 mN/m and no more than 40 mN/m as in the present invention.

With regard to the relationships concerning the variation of surface tension by change of composition, the same trends apply to Production Examples A2 to A8.

(Evaluation of Restraining of Material Attack)

In Production Example A1, the polymerization conditions (synthesis time and amount of radical polymerization initiator) of the polymer were adjusted to prepare dispersions with polymers of different molecular weights. The results of evaluation of these dispersions in the material attacking properties are shown in Table 7. Butyl rubber, which is a component material of an ink cartridge, was used as the material for evaluation, and the values are shown as weight loss percentage (%) upon leaving for 7 days at 70° C.

TABLE 7

Evaluation results for material attacking property

| | Molecular weight × $10^4$ | | | | | |
|---|---|---|---|---|---|---|
| | 0.51 | 3.10 | 5.23 | 10.21 | 20.13 | 30.11 |
| Weight loss percentage (%) | 15.0 | 3.0 | 0.1 | 0.1 | 0.1 | 0.1 |

As is clear from the results of Table 7, the material attacking property is lowered by the polymer having a styrene-equivalent molecular weight as determined by gel permeation chromatography (GPC) of no less than 20000 as in the present invention. With regard to the relationships concerning dispersions using polymers of different molecular weights, the same trends apply to Production Examples A2 to A8.

It is thus clear that an aqueous ink, which is excellent in stability, is low in blurring and high in coloration on regular paper, exhibits adequate coloration as well as fixing property on specialized paper, and is excellent in the discharge stability of ink from an ink jet head and low in material attacking property in ink jet recording, can be prepared by means of controlling the styrene-equivalent molecular weight of the polymer as determined by gel permeation chromatography (GPC), the particle diameter of the pigment, etc., and also controlling the molecular weight dispersion and the surface tension, Example 2

(Production of dispersions B1 to B4)

First, dispersion B1 uses Monarch 880 (made by Cabot Corp.), which is a carbon black. After performing nitrogen replacement of the interior of a reaction vessel, equipped with a stirrer, thermometer, reflux tube, and dripping funnel, 20 parts of benzyl methacrylate, 5 parts of 2-ethylhexyl methacrylate, 15 parts of butyl methacrylate, 10 parts of lauryl methacrylate, 2 parts of methacrylic acid, and 0.3 parts of t-dodecyl mercaptan were placed in the reaction vessel and heated to 70° C. Then 150 parts of benzyl methacrylate, 15 parts of acrylic acid, 50 parts of butyl methacrylate, 1 part of t-dodecyl mercaptan, 20 parts of methyl ethyl ketone, and 1 part of azobisisobutyronitrile, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%.

Upon taking a part of the abovementioned dispersion polymer and subjecting it to gel permeation chromatography (GPC) using the L7100 System made by Hitachi, Ltd., the styrene-equivalent molecular weight as measured using THF as the solvent was found to be 50000. The dispersion Mw/Mn) of the molecular weight was 3.1.

40 parts of the abovementioned dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 μm membrane filter was carried out, thereby preparing dispersion B1, having a solids content (dispersion polymer and carbon black) of 20%.

Dispersions B2 to B4 were prepared in the same manner as described above. The weight ratio of the dispersion polymer to the pigment was adjusted to 20:80. For dispersion B2, Pigment Blue 15:3 (copper phthalocyanine pigment; made by Clariant, Ltd.) was used. For dispersion B3, Pigment Red 122 (dimethylquinacridone pigment; made by Clariant, Ltd.) was used. For dispersion B4, Pigment Yellow 180 (diketopyrrolopyrrole; made by Clariant, Ltd.) was used.

(Production of Dispersions B5 to B8)

Dispersions B5 to B8 were prepared in the same manner as dispersions B1 to B4, except using a mixture of 50% benzyl methacrylate and 50% benzyl acrylate in place of benzyl methacrylate. For dispersion B5, Leben C (made by Columbian Carbon Ltd.), which is a carbon black, was used, and for dispersion B6, Pigment Blue 15:4 (copper phthalocyanine pigment; made by Clariant, Ltd.) was used for dispersion B7, Pigment Violet 19 (quinacridone pigment; made by Clariant, Ltd.) was used. For dispersion B8, Pigment Yellow 74 (condensed azo pigment; made by Clariant, Ltd.) was used.

(Preparation of Ink Jet Inks)

Examples of compositions that are favorable as ink jet recording ink are indicated below as specific examples of aqueous ink. The added amount of dispersion is indicated with the amount thereof (solids concentration: total amount of pigment and dispersion polymer) converted to weight. The particle diameter of a pigment is indicated in units of nm in < >. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in each of the Examples. The respective ink compositions are shown in Table 8.

TABLE 8

Ink compositions

| | Production Examples | | | | | | | |
|---|---|---|---|---|---|---|---|---|
| | B1 | B2 | B3 | B4 | B5 | B6 | B7 | B8 |
| Dispersion B1 | 7.5 | — | — | — | — | — | — | — |
| Dispersion B2 | — | 4.0 | — | — | — | — | — | — |
| Dispersion B3 | — | — | 6.5 | — | — | — | — | — |
| Dispersion B4 | — | — | — | 6.0 | — | — | — | — |
| Dispersion B5 | — | — | — | — | 8.0 | — | — | — |
| Dispersion B6 | — | — | — | — | — | 5.0 | — | — |
| Dispersion B7 | — | — | — | — | — | — | 6.0 | — |
| Dispersion B8 | — | — | — | — | — | — | — | 8.0 |
| DEGmBE | — | 10.0 | — | — | 10.0 | — | 8.0 | 10.0 |
| TEGmBE | 5.0 | — | — | 3.0 | — | 6.0 | — | — |
| PgmBE | — | — | — | — | — | — | — | 2.0 |
| DPGmBE | — | — | — | — | 2.0 | — | — | — |
| 1,2-hexanediol | — | — | 4.0 | — | — | — | — | — |
| 1,2-pentanediol | — | — | — | 5.0 | — | — | — | — |
| Glycerin | 17.0 | 17.0 | 16.0 | 15.0 | 14.0 | 15.0 | 15.0 | 9.0 |
| Triethylene glycol | — | — | 7.0 | — | 2.0 | — | — | 5.0 |
| Tetraethylene glycol | — | — | 1.5 | 9.0 | — | — | — | — |
| Dipropylene glycol | — | 5.0 | — | — | — | — | — | — |
| Trimethylolpropane | — | — | — | 2.0 | — | 1.0 | 2.0 | — |
| 2-pyrrolidone | 5.0 | — | 2.0 | 2.0 | — | 2.0 | — | — |
| Olfin E1010 | 1.0 | 1.2 | — | — | — | 1.0 | 1.0 | — |
| Olfin STG | — | — | 0.5 | — | — | — | — | 1.0 |
| Surfynol 61 | — | — | — | 0.5 | — | — | 0.5 | — |
| Triethanolamine | 0.8 | 0.9 | 1.0 | 0.7 | 0.9 | 0.9 | — | 0.9 |
| Ion-exchanged water | Residual quantity | Residual quantity | Residual quantity | Residual quantity | Residual quantity | Residual quantity | Residual quantity | Residual quantity |

In Table 8, the abbreviations indicate the following.
TEGmBE: triethylene glycol monobutyl ether
Olfin E10110 (acetylene glycol surfactant, made by Nissin Chemical Industry Co., Ltd.)
DEGmBE: diethylene glycol monobutyl ether
Olfin STG (acetylene glycol surfactant, made by Nissin Chemical Industry Co., Ltd.)
Surfynol 61 (acetylene alcohol surfactant, made by Air Products and Chemicals, Inc. (USA))
DPGmBE: dipropylene glycol monobutyl ether
PGmBE: propylene glycol monobutyl ether (Evaluation of Dispersion Stability)

Table 9 shows the percentage change in viscosity upon leaving for 30 days at 60° C. for each of the aqueous inks prepared by the above-described methods. Results are shown for the inks of Production Examples B1 to B8, and for variations of Production Example B1, in which the polymer synthesis method (synthesis time and amount of radical polymerization initiator) was varied to vary the respective values of molecular weight and the dispersion Mw/Mn, as well as for variations of Production Example B1, in which the particle diameter of the pigment was varied. The particle diameter was measured using the Zetasizer 3000HS (made by Malvern Instruments, Inc. (UK)) (light scattering method). For the percentage change in viscosity, viscosity values were measured at an angle of 60° using the AMVn, made by Anton Paar GmbH, and 1−(value after 30 days)/(initial value) is indicated in the form of percentage (%). The OD values were measured using the Gretag Macbeth Spectroscan (made by Gretag Corp.).

TABLE 9

Measurement results of percentage change in viscosity

| Production Example | Molecular weight × $10^4$ | Mw/Mn | Particle diameter (nm) | Percentage change in viscosity (%) |
|---|---|---|---|---|
| B1 | 0.51 | 3.1 | 100 | 1.4 |
|  | 1.12 | 3.1 | 100 | 1.2 |
|  | 3.10 | 3.1 | 100 | 1.0 |
|  | 5.23 | 3.1 | 100 | 1.0 |
|  | 10.21 | 1.3 | 100 | 1.2 |
|  | 10.21 | 2.2 | 100 | 1.0 |
|  | 10.21 | 3.1 | 100 | 1.0 |
|  | 10.21 | 3.1 | 15 | 13.2 |
|  | 10.21 | 3.2 | 20 | 1.0 |
|  | 10.21 | 5.3 | 300 | 1.8 |
|  | 10.21 | 10.5 | 100 | 1.0 |
|  | 10.21 | 11.3 | 100 | 1.2 |
|  | 20.13 | 3.1 | 100 | 2.4 |
|  | 25.20 | 3.1 | 100 | 3.5 |
|  | 30.11 | 3.1 | 100 | 8.1 |
| B2 | 5.62 | 3.0 | 90 | 1.0 |
| B3 | 5.96 | 3.0 | 95 | 1.0 |
| B4 | 5.82 | 3.5 | 100 | 1.0 |
| B5 | 7.35 | 3.5 | 100 | 1.0 |
| B6 | 7.58 | 3.0 | 90 | 1.0 |
| B7 | 4.24 | 3.0 | 95 | 1.0 |
| B8 | 6.13 | 3.5 | 100 | 1.0 |

The results of Table 9 show that the storage stability is excellent when the colorant is a pigment with a particle diameter as determined by the light scattering method of no less than 20 nm and no more than 200 nm, and the polymer thereof has a styrene-equivalent molecular weight as determined by gel permeation chromatography (GPC) of no less than 20000 and no more than 200000 and a dispersion Mw/Mn of 2 to 10, preferably 2 to 5, and more preferably 2.5 to 4, as in the present invention. In regard to the relationships concerning the variations of the respective values of the molecular weight, the dispersion Mw/Mn, and the particle diameter of the pigment, the same trends apply to the Production Examples B2 to B8.

(Evaluation of OD on Regular Papers)

Table 10 shows the evaluation results of printing quality on regular papers. In Production Example B1, the polymerization conditions (synthesis time and amount of radical polymerization initiator) of the polymer were adjusted to prepare dispersions with different molecular weights, and these dispersions are compared in the Table. The papers used in these evaluations are the commercially available papers, Xerox 4024 paper (made by Xerox USA Corp.), Xerox 10 paper (made by Fuji Xerox Co., Ltd.), Ricopy 6200 paper (made by Ricoh Co., Ltd.), and Epson EPP paper (made by Seiko Epson Co., Ltd.). The OD values were measured by the same method as that of Table 3. Results shown in Table 10 were given with respect to Production Example B1.

TABLE 10

OD on regular papers according to polymer molecular weight and pigment concentration

| | Polymer molecular weight × $10^4$ | | | | | |
|---|---|---|---|---|---|---|
| | 0.51 | 3.10 | 5.23 | 10.21 | 20.13 | 30.11 |
| Xerox4024 | 1.40 | 1.41 | 1.41 | 1.42 | 1.32 | 1.20 |
| Xerox10 | 1.41 | 1.41 | 1.39 | 1.41 | 1.36 | 1.15 |
| Ricopy6200 | 1.32 | 1.34 | 1.35 | 1.36 | 1.31 | 1.15 |
| EPP | 1.42 | 1.42 | 1.42 | 1.43 | 1.41 | 1.23 |

As is clear from the results of Table 10, a high OD is realized by the polymer having a styrene-equivalent molecular weight as determined by gel permeation chromatography (GPC) of no more than 200000 as in the present invention. In regard to the relationships of dispersions using polymers of different molecular weights, the same trends apply to Production Examples B2 to B8.

(Evaluation of the Relationship Between the Amount of Benzyl Methacrylate and the OD Value)

Dispersions using polymers (molecular weight: approximately 50000), which were varied in the calculated introduction amounts of benzyl methacrylate, benzyl acrylate, and butyl methacrylate (corresponding to 85% of the entire polymer) but otherwise prepared in the same manner as Production Example B1, were prepared. And the results of evaluation in the OD on regular paper and the ink storage stability of inks are shown in Table 11. The storage stability is indicated by the percentage increase of viscosity (%) after 7 days of storage under 70° C. With the examples shown here, Xerox 4024 paper (made by Xerox USA Corp.) was used as the regular paper and printing at 720 dpi photo quality using the EM930C, made by Seiko Epson Co., Ltd., was performed. The OD values were evaluated in the same manner as in the cases of Table 10.

TABLE 11

Benzyl methacrylate/benzyl acrylate amounts and OD (% of added amount) on regular paper and storage stability

| Benzyl methacrylate | Benzyl acrylate | Butyl acrylate | OD | Percentage increase of viscosity (%) |
|---|---|---|---|---|
| 85 | 0 | 0 | 1.35 | 15.0 |
| 80 | 0 | 5 | 1.41 | 1.2 |
| 75 | 0 | 20 | 1.43 | 1.1 |
| 60 | 0 | 25 | 1.45 | 1.0 |
| 45 | 0 | 50 | 1.42 | 1.0 |
| 40 | 0 | 45 | 1.38 | 1.0 |
| 35 | 0 | 50 | 1.21 | 1.0 |
| 20 | 0 | 65 | 1.15 | 1.0 |
| 15 | 0 | 70 | 1.05 | 1.1 |
| 0 | 85 | 0 | 1.33 | 20.5 |
| 0 | 65 | 20 | 1.43 | 1.0 |
| 0 | 60 | 25 | 1.43 | 1.0 |
| 0 | 55 | 30 | 1.43 | 1.0 |
| 0 | 15 | 70 | 1.02 | 1.2 |
| 45 | 40 | 0 | 1.34 | 1.2 |
| 30 | 30 | 25 | 1.45 | 1.0 |
| 20 | 30 | 35 | 1.44 | 1.0 |
| 10 | 35 | 40 | 1.40 | 1.1 |
| 10 | 5 | 70 | 1.10 | 1.2 |

As can be understood from the results of Table 11, the OD value is improved by using a polymer using benzyl methacrylate and/or benzyl acrylate at an amount of 40 to 80% as the polymer for dispersing the pigment. That is, it can be understood that when this amount is less than 40%, the coloration on PPC paper or other regular paper degrades, while in the excess of 80%, dispersion stability is not obtained. Though the results for just Production Example B1 are shown for the present Example, the trends of Table 11 apply likewise to Production Examples B2 to B8 and also apply likewise when using other regular papers, such as Xerox 10 paper (made by Fuji Xerox Co., Ltd.), Ricopy 6200 paper (made by Ricoh Co., Ltd.), Epson EPP paper (made by Seiko Epson Co., Ltd.), etc.

(Evaluation of Fixing Property and OD on Specialized Paper)

Table 12 shows results of preparing dispersions using polymers of different molecular weights, prepared by adjusting the polymerization conditions (synthesis time and amount of radical polymerization initiator) of the polymer in Production Example B1, preparing dispersions using polymers prepared using styrene in place of benzyl methacrylate in Example 1, and evaluating the fixing properties and OD values of these dispersions on specialized paper. The OD values were evaluated by the same method as that of Table 3. The fixing property was evaluated using specialized paper (PM photo paper) and observing the rubbing off of ink when a printed surface and a rear surface are overlapped with a load of 300 g and moved at a speed of 1 m/s. In Table 3, AA indicates that there was no rub-off whatsoever even after two times of movement, A indicates that though there was no rub-off whatsoever even after one time of movement, slight rub-off occurred after two times of movement, B indicates that there was slight rub-off, C indicates that there was rub-off and transfer onto the rear surface, and D indicates that there was considerable rub-off and transfer onto the rear surface.

TABLE 12

Fixing property and OD on specialized paper

| | Production Examples (Benzyl methacrylate) Molecular weight × $10^4$ | | | | | |
|---|---|---|---|---|---|---|
| | 0.52 | 3.21 | 5.41 | 11.01 | 19.33 | 32.68 |
| OD | 1.8 | 2.2 | 2.5 | 2.6 | 2.3 | 2.0 |
| Resistance to rubbing | B | A | AA | AA | AA | B |

| | Comparative Examples (Styene) Molecular weight × $10^4$ | | | | | |
|---|---|---|---|---|---|---|
| | 0.55 | 3.10 | 5.23 | 10.21 | 20.13 | 30.11 |
| OD | 1.7 | 2.1 | 2.3 | 2.5 | 2.4 | 1.9 |
| Resistance to rubbing | C | B | A | A | A | C |

As is clear from the results of Table 12, the fixing property on specialized paper is improved and a high OD is realized by the polymer having a styrene-equivalent molecular weight as determined by gel permeation chromatography (GPC) of no less than 20000 and no more than 200000, as in the present invention. In regard to the relationships of dispersions using polymers of different molecular weights, the same trends apply to Production Examples B2 to B8.

(Evaluation of Discharge Stability)

Table 13 shows the discharge stability evaluation results for the inks of Production Examples B1 to B8 and for variations of Production Example B1, wherein the composition was varied to vary the surface tension. The surface tension was increased by decreasing the added amounts of Olfin E1010, Olfin STG, Surfynol 61, DEGmBE, TEGmBE, PGmBE, and DPGmBE of Table 1. The surface tension was lowered by the use of the fluorine-based surfactant Futagent 251 (made by Neos Corp.). Surface tension measurements were made with the automatic surface tensiometer Type CBVP-A3 (made by Kyowa Interface Science Co., Ltd.). For evaluation of the discharge stability, the ink jet printer EM-930C, made by Seiko Epson Co., Ltd., was used to perform continuous printing on 100 pages of A4-size Xerox P paper at 2000 letters/page of Microsoft Word MS Ming style characters of style standard size 10. A indicates that no print distortions occurred, B indicates that print distortions occurred at less than 10 locations, C indicates that print distortions occurred at no less than 10 locations but less than 100, and D indicates that print distortions occurred at no less than 100 locations.

TABLE 13

Evaluation results of discharge stability

| Production Example | Surface tension | Molecular weight × $10^4$ | Discharge stability |
|---|---|---|---|
| B1 | 19 | 5.55 | D |
| | 20 | 5.55 | B |
| | 30 | 0.50 | B |
| | 30 | 5.55 | A |
| | 30 | 32.10 | B |
| | 41 | 5.55 | C |
| B2 | 30 | 5.24 | A |
| B3 | 31 | 5.76 | A |
| B4 | 32 | 5.55 | A |
| B5 | 30 | 7.15 | A |
| B6 | 29 | 5.60 | A |
| B7 | 30 | 5.56 | A |
| B8 | 31 | 5.31 | A |

As can be understood from the results of Table 13, the discharge stability is improved by the polymer having a styrene-equivalent molecular weight as determined by gel permeation chromatography (GPC) of no less than 20000 and no more than 200000 and a surface tension of no less than 20 mN/m and no more than 40 mN/m as in the present invention. With regard to the relationships concerning the variation of surface tension by change of composition, the same trends apply to Production Examples B2 to B8.

(Evaluation of Discoloration)

Table 14 shows the results of evaluating the discoloration of Production Examples B2, B3, B4, B6, B7, and B8 and dispersions prepared using polymers, which were prepared using styrene in place of benzyl methacrylate in these Production Examples (indicated as Comparative Examples B2, B3, and B4 and Comparative Examples B6, B7, and B8 in correspondence to the examples). For discoloration, gray patterns (of 3 levels differing in OD) were prepared using the cyan ink, magenta ink, and yellow ink of Production Examples B2 to B4, and printed onto Xerox 4024 paper and Seiko Epson PM photo paper using the EM930C. The ΔE values after leaving the printed matter for 1 year under the conditions of 30° C. and 45% relative humidity are indicated as the evaluation results.

TABLE 14

Evaluation results for discoloration

|  |  | Xerox4024 | | | PM photo paper | | |
|---|---|---|---|---|---|---|---|
| Production Examples B2, B3, B4 (benzyl methacrylate) | OD | 0.31 | 0.55 | 0.72 | 0.42 | 0.62 | 0.88 |
|  | Percentage change in ΔE (%) | 2.2 | 1.5 | 1.0 | 2.1 | 1.3 | 0.9 |
| Comparative Examples B2, B3, B4 (styrene) | OD | 0.32 | 0.54 | 0.74 | 0.43 | 0.63 | 0.90 |
|  | Percentage change in ΔE (%) | 6.8 | 4.3 | 3.3 | 6.4 | 4.2 | 2.8 |
| Production Examples B6, B7, B8 (benzyl methacrylate) | OD | 0.31 | 0.55 | 0.72 | 0.42 | 0.62 | 0.88 |
|  | Percentage change in ΔE (%) | 2.2 | 1.6 | 1.2 | 2.0 | 1.4 | 1.0 |
| Comparative Examples B6, B7, B8 (styrene) | OD | 0.32 | 0.54 | 0.74 | 0.43 | 0.63 | 0.90 |
|  | Percentage change in ΔE (%) | 8.0 | 6.4 | 3.4 | 8.2 | 6.2 | 3.1 |

As is clear from the results of Table 14, this invention's ink is low in discoloration. Likewise, the same trends were seen in the case where gray patterns were prepared using the black ink of Production Example B1, with the results were better results. While three colors are used to prepare parts of high lightness and black is used in parts of low lightness in the gray pattern, a problem of discoloration is seen especially in the parts of high lightness.

It can thus be understood that an aqueous ink, which is excellent in stability, low in blurring and high in coloration on regular paper, and adequate in coloration and provided with fixing property on specialized paper, can be prepared, and furthermore, in ink jet recording, excellent discharge stability of the ink from an ink jet head and low discoloration are realized, by the polymer having a styrene-equivalent molecular weight as determined by gel permeation chromatography (GPC) of no less than 20000 and no more than 200000 as described above, an aqueous ink, which is excellent in stability, low in blurring and high in coloration on regular paper, and adequate in coloration and provided with fixing property on specialized paper, can be prepared, and furthermore, in ink jet recording, excellent discharge stability of the ink from an ink jet head and low discoloration are realized.

Example 3

The respective measurement values obtained for this Example were measured by the following methods.

(Measurement of the Dispersion of Molecular Weight of the Dispersion Polymer)

The molecular weight was measured by taking a part of the synthesized polymer and subjecting it to gel permeation chromatography (GPC) using the L7100 System made by Hitachi, Ltd., and measuring the styrene-equivalent number average molecular weight using THF as the solvent. The dispersion was determined from Mn (number average molecular weight) and Mw (weight average molecular weight), using the styrene-equivalent number average molecular weight and the styrene-equivalent weight average molecular weight, determined in likewise manner.

(Evaluation of Dispersion Stability)

The dispersion stability is indicated as the percentage change in viscosity (%) upon leaving each aqueous ink composition at 60° C. for 30 days.

(Measurement of Particle Diameter)

The particle diameter was measured using the Zetasizer 3000HS (made by Malvern Instruments, Inc. (UK) (light scattering method).

(Measurement of the Percent Change of Viscosity)

For the percentage change in viscosity, viscosity values were measured at an angle of 60° using the AMVn, made by Anton Paar GmbH, and 1−(value after 30 days)/(initial value) is indicated in the form of percentage (%).

(Measurement of OD)

The OD was measured using the Gretag Macbeth Spectroscan SPM-50 (made by Gretag Corp.).

(Measurement of Glossiness)

The specular glossiness of a recorded surface was measured for an incidence angle of 60 degrees using a gloss checker (IG-320, made by Horiba, Ltd.) and the average of five measurements was determined for each recording paper. Specialized paper (PM photo paper, made by Seiko Epson Co., Ltd.) was used as the medium and printing at 720 dpi photo quality using the EM930C, made by Seiko Epson Co., Ltd., as the printer was performed to prepare the recorded surface.

(Measurement of Surface Tension)

Surface tension was measured with the automatic surface tensiometer Type CBVP-A3 (made by Kyowa Interface Science Co., Ltd.).

(Evaluation of Discharge Stability)

For evaluation of the discharge stability, continuous printing on 100 pages of A4-size Xerox P paper at 2000 letters/page of Microsoft Word MS Ming style characters of style standard size 10 were performed with the ink jet printer EM-930C, made by Seiko Epson Co., Ltd., and the circumstances of occurrence of print distortions were observed.

(Evaluation of Fixing Property and OD on Specialized Paper)

The fixing property was evaluated using specialized paper (PM photo paper) and observing the rubbing off of ink when a printed surface and a rear surface are overlapped with a load of 300 g and moved at a speed of 30 cm/s.

(Measurement of ΔE)

L*, a*, and b* were measured using the Gretag Macbeth Spectroscan SPM-70 (made by Gretag Corp.) and ΔE was calculated as the scalar value of these measured values.

(Production of Dispersions)

Dispersion C1 uses Monarch 880 (made by Cabot Corp.), which is a carbon black. After performing nitrogen replacement of the interior of a reaction vessel, equipped with a stirrer, thermometer, reflux tube, and dripping funnel, 20 parts of benzyl acrylate, 5 parts of 2-ethylhexyl acrylate, 15 parts of butyl acrylate, 10 parts of lauryl acrylate, 2 parts of acrylic acid, and 0.3 parts of t-dodecyl mercaptan were placed in the reaction vessel and heated to 70° C. Then 150 parts of benzyl acrylate, 15 parts of acrylic acid, 50 parts of butyl acrylate, 1 part of t-dodecyl mercaptan, 20 parts of methyl ethyl ketone, and 1 part of azobisisobutyronitrile, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%. The dispersion (Mw/Mn) of the molecular weight was 3.1.

40 parts of the abovementioned dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 μm membrane filter was carried out, thereby preparing dispersion C1, having a solids content (dispersion polymer and carbon black) of 20%.

Dispersion C2 was prepared in the same manner as dispersion C1, except using Pigment Blue 15:3 (copper phthalocyanine pigment; made by Clariant, Ltd.) and using cyclohexyl acrylate in place of benzyl acrylate in the polymer synthesis method. The value of the molecular weight dispersion (Mw/Mn) was 3.0.

Dispersion C3 was prepared in the same manner as dispersion C1, except using Pigment Red 122 (dimethylquinacridone pigment; made by Clariant, Ltd.) and using cyclohexyl acrylate in place of polymer synthesis method. The value of the molecular weight dispersion Mw/Mn) was 3.0.

Dispersion C4 was prepared in the same manner as dispersion C1, except using Pigment Yellow 180 (diketopyrrolopyrrole; made by Clariant, Ltd.) and using cyclohexyl acrylate in place of benzyl acrylate in the polymer synthesis method. The value of the molecular weight dispersion (Mw/Mn) was 3.5.

Dispersion C5 was prepared in the same manner as dispersion C1, except using a mixture of 50% benzyl acrylate and 50% isobornyl acrylate in place of the benzyl acrylate in dispersion C1 and using Leben C (made by Columbian Carbon Ltd.), which is a carbon black. The value of the molecular weight dispersion (Mw/Mn) was 3.5.

Dispersion C6 was prepared in the same manner as dispersion C5, except using Pigment Blue 15:3 (copper phthalocyanine pigment; made by Clariant, Ltd.) and using a mixture of 50% cyclohexyl acrylate and 50% isobornyl acrylate in place of the mixture of 50% benzyl acrylate and 50% isobornyl acrylate in the polymer synthesis method. The value of the molecular weight dispersion (Mw/Mn) was 3.0.

Dispersion C7 was prepared in the same manner as dispersion C5, except using Pigment Red 122 (dimethylquinacridone pigment; made by Clariant, Ltd.) and using a mixture of 50% cyclohexyl acrylate and 50% isobornyl acrylate in place of the mixture of 50% benzyl acrylate and 50% isobornyl acrylate in the polymer synthesis method. The value of the molecular weight dispersion (Mw/Mn) was 3.0.

Dispersion C8 was prepared in the same manner as dispersion C5, except using Pigment Yellow 180 (diketopyrrolopyrrole; made by Clariant, Ltd.) and using a mixture of 50% cyclohexyl acrylate and 50% isobornyl acrylate in place of the mixture of 50% benzyl acrylate and 50% isobornyl acrylate in the polymer synthesis method. The value of the molecular weight dispersion (Mw/Mn) was 3.5.

For each of dispersions C2 to C8, the weight ratio of the dispersion polymer to the pigment was adjusted to 20:80.

(Preparation of Ink Jet Inks)

Favorable examples of compositions as ink jet recording ink are indicated below in Table 15, as specific examples of aqueous ink. In Table 15, the added amount of dispersion is indicated with the amount thereof (solids concentration: total amount of pigment and dispersion polymer) converted to weight. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in each of the Examples.

TABLE 15

| | Ink compositions | | | | | | | |
|---|---|---|---|---|---|---|---|---|
| | Production Examples | | | | | | | |
| | C1 | C2 | C3 | C4 | C5 | C6 | C7 | C8 |
| Dispersion C1 | 7.5 | — | — | — | — | — | — | — |
| Dispersion C2 | — | 4 | — | — | — | — | — | — |
| Dispersion C3 | — | — | 6.5 | — | — | — | — | — |
| Dispersion C4 | — | — | — | 6 | — | — | — | — |
| Dispersion C5 | — | — | — | — | 8 | — | — | — |
| Dispersion C6 | — | — | — | — | — | 5 | — | — |
| Dispersion C7 | — | — | — | — | — | — | 6 | — |
| Dispersion C8 | — | — | — | — | — | — | — | 8 |
| TEGmBE | 2 | 1 | 1 | 1 | 2 | 1 | 1 | 1 |
| 1,2-hexanediol | 3 | 4 | 4 | 4 | 3 | 4 | 4 | 4 |
| Glycerin | 10 | 15 | 10 | 10 | 10 | 13 | 10 | 7 |
| Trimethylolpropane | 4 | 7 | 5 | 5 | 4 | 7 | 5 | 5 |
| Surfynol 104 | 0.1 | 0.1 | 0.1 | 0.1 | 0.1 | 0.1 | 0.1 | 0.1 |
| Ion-exchanged water | Residual quantity | Residual quantity | Residual quantity | Residual quantity | Residual quantity | Residual quantity | Residual quantity | Residual quantity |

TEGmBE: triethylene glycol monobutyl ether (Evaluation of Dispersion Stability)

The aqueous ink prepared by the above-described methods were left for 30 days at 60° C., and the values of percentage change in viscosity (%) are shown. A lower percentage change in viscosity indicates a higher stability. Results are shown for the inks of Production Examples C1 to C8 and for variations of Production Example C1, in which the polymer synthesis method (synthesis time and amount of radical polymerization initiator) was varied to vary the respective values of average molecular weight and the dispersion Mw/Mn, as well as for variations of Production Example C1 in which the particle diameter of the pigment was varied. For variation of the molecular weight dispersion Mw/Mn, a plurality of types of polymers of different molecular weights were mixed and used. The results are shown in Table 16. The molecular weights shown in Table 16 are number average molecular weights.

TABLE 16

Measurement results of percentage change in viscosity

| Production Example | Molecular weight × $10^4$ | Mw/Mn | Particle diameter (nm) | Percentage change in viscosity (%) |
|---|---|---|---|---|
| C1 | 0.51 | 3.1 | 100 | 1.4 |
|    | 1.12 | 3.1 | 100 | 1.2 |
|    | 3.10 | 3.1 | 100 | 1.0 |
|    | 5.23 | 3.1 | 100 | 1.0 |
|    | 10.21 | 1.3 | 100 | 1.2 |
|    | 10.21 | 2.2 | 100 | 1.0 |
|    | 10.21 | 3.1 | 100 | 1.0 |
|    | 10.21 | 3.1 | 15 | 13.2 |
|    | 10.21 | 3.2 | 20 | 1.0 |
|    | 10.21 | 5.3 | 300 | 1.8 |
|    | 10.21 | 10.5 | 100 | 1.0 |
|    | 10.21 | 11.3 | 100 | 1.2 |
|    | 20.13 | 3.1 | 100 | 2.4 |
|    | 25.20 | 3.1 | 100 | 3.5 |
|    | 30.11 | 3.1 | 100 | 8.1 |
| C2 | 5.62 | 3.0 | 90 | 1.0 |
| C3 | 5.96 | 3.0 | 95 | 1.0 |
| C4 | 5.82 | 3.5 | 100 | 1.0 |
| C5 | 7.35 | 3.5 | 100 | 1.0 |
| C6 | 7.58 | 3.0 | 90 | 1.0 |
| C7 | 4.24 | 3.0 | 95 | 1.0 |
| C8 | 6.13 | 3.5 | 100 | 1.0 |

(Evaluation of OD on Regular Papers)

In Production Example C1, the conditions of polymerization (synthesis time and amount of radical polymerization initiator) of the polymer were adjusted to prepare dispersions with polymers of different molecular weights. Dispersions using the same pigment as that of Example 1, a commercially available acrylic styrene dispersion polymer, and alumina beads and dispersed using an Eiger mill, were also prepared. A comparison between these dispersions is shown. A higher OD value indicates a better result. The papers used in these evaluations were commercially available regular papers, such as Xerox 4024 paper (made by Xerox USA Corp.), Xerox 10 paper (made by Fuji Xerox Co., Ltd.), Ricopy 6200 paper (made by Ricoh Co., Ltd.), and Epson EPP paper (made by Seiko Epson Co., Ltd.). Table 17 shows the evaluation results of the printing quality on these regular papers. These results clearly show that preferable OD values on regular paper are obtained by phase inversion emulsification, regardless of the type of regular paper. Also, the number average molecular weight is preferably no less than 5000 and no more than 200000, more preferably no less than 20000 and no more than 100000.

TABLE 17

Polymer molecular weight and OD on regular papers

| Dispersion method | Molecular weight × $10^4$ | Xerox4024 | Xerox10 | Ricopy6200 | EPP |
|---|---|---|---|---|---|
| Phase inversion emulsification | 0.51 | 1.40 | 1.41 | 1.32 | 1.42 |
|  | 3.10 | 1.41 | 1.41 | 1.34 | 1.42 |
|  | 5.23 | 1.41 | 1.39 | 1.35 | 1.42 |
|  | 10.21 | 1.42 | 1.41 | 1.36 | 1.43 |
|  | 20.13 | 1.32 | 1.36 | 1.31 | 1.41 |
|  | 30.11 | 1.20 | 1.15 | 1.15 | 1.23 |
|  | 30.11 | 1.20 | 1.15 | 1.15 | 1.23 |
| Eiger mill | 3.20 | 1.01 | 1.00 | 0.95 | 1.02 |
|  | 10.61 | 0.98 | 0.95 | 0.94 | 1.00 |

(Evaluation of the Relationship Between the Amount of Acrylate and Gloss on Specialized Paper)

The dispersion polymers of Production Example C1 were partially changed from benzyl acrylate, 2-ethylhexyl acrylate, butyl acrylate, lauryl acrylate, and acrylic acid, each of which is a component comprising an acrylate or acrylic acid, to benzyl methacrylate, 2-ethylhexyl methacrylate, butyl methacrylate, lauryl methacrylate, and methacrylic acid, each of which is a component comprising a methacrylate or methacrylic acid. And the changes in the gloss of printed matter printed onto specialized paper (PM photo paper, made by Seiko Epson Co., Ltd.) were evaluated for these dispersions. These Production Examples are indicated as C11 to C19. The added amounts shown here are loading weights (weight %) of the monomers. A higher glossiness indicates a better result. From these results, it can be understood that favorable glossiness can be obtained when the acrylic amount is no less than 80%.

TABLE 18

Results of measurement of gloss for cases where the dispersion polymers are changed from components comprising an acrylate or acrylic acid to components comprising a methacrylate or methacrylic acid

| | Polymer composition | | | | | | | | |
|---|---|---|---|---|---|---|---|---|---|
| | C11 | C12 | C13 | C14 | C15 | C16 | C17 | C18 | C19 |
| BZA | 50 | 50 | 50 | 40 | 30 | 0 | 0 | 40 | 0 |
| 2EHA | 20 | 0 | 10 | 0 | 10 | 0 | 0 | 0 | 10 |
| BA | 10 | 20 | 10 | 30 | 20 | 0 | 10 | 0 | 0 |
| LA | 10 | 10 | 0 | 10 | 10 | 0 | 0 | 0 | 0 |
| AA | 10 | 10 | 10 | 10 | 10 | 0 | 0 | 0 | 5 |
| BZMA | 0 | 0 | 0 | 10 | 0 | 50 | 50 | 30 | 30 |
| 2EHMA | 0 | 0 | 20 | 0 | 0 | 20 | 0 | 10 | 20 |
| BMA | 0 | 0 | 0 | 0 | 0 | 8 | 18 | 8 | 9 |
| LMA | 0 | 10 | 0 | 0 | 0 | 10 | 10 | 0 | 0 |

TABLE 18-continued

Results of measurement of gloss for cases where the dispersion polymers are changed from components comprising an acrylate or acrylic acid to components comprising a methacrylate or methacrylic acid

| | Polymer composition | | | | | | | | |
|---|---|---|---|---|---|---|---|---|---|
| | C11 | C12 | C13 | C14 | C15 | C16 | C17 | C18 | C19 |
| MA | 0 | 0 | 0 | 0 | 0 | 12 | 12 | 12 | 6 |
| ST | 0 | 0 | 0 | 0 | 20 | 0 | 0 | 0 | 20 |
| Mn[1] | 10000 | 20000 | 25000 | 31000 | 25000 | 3000 | 26000 | 31000 | 8000 |
| Mw[2] | 31000 | 76000 | 71000 | 105000 | 79000 | 93000 | 70000 | 100000 | 25000 |
| Mw/Mn | 3.1 | 3.8 | 2.8 | 3.4 | 3.2 | 3.1 | 2.7 | 3.2 | 3.1 |
| Acrylic amount[3] | 100 | 90 | 80 | 100 | 80 | 0 | 10 | 40 | 15 |
| Glossiness | 78 | 70 | 65 | 75 | 65 | 35 | 30 | 45 | 40 |

[1] Mn: number average molecular weight
[2] Mw: weight average molecular weight
[3] Acrylic amount: total amount of acrylic acid and acrylates (%) Benzyl acrylate (BZA) 2-ethylhexyl acrylate (2EHA) Butyl acrylate (BA) Lauryl acrylate (LA) Acrylic acid (AA) Benzyl methacrylate (BZMA) 2-ethylhexyl methacrylate (2EHMA) Butyl methacrylate (BMA) Lauryl methacrylate (LMA) Methacrylic acid (MA) Styrene (ST)

(Evaluation of Fixing Property and OD on Specialized Paper)

In Production Example C1, the conditions of polymerization (synthesis time and amount of azobisisovaleronitrile, which is a radical polymerization initiator) of the polymer were adjusted to prepare dispersions with polymers of different number average molecular weights. Dispersions, using polymers with which the benzyl methacrylate in Production Example C1 was changed to styrene, were also prepared. Table 19 shows the results of evaluating the fixing properties and OD values of these dispersions on specialized. The OD values were evaluated by the same method as that of the cases shown in Table 17. The molecular weights shown in Table 19 are number average molecular weights. In Table 19, AA indicates that there was no rub-off whatsoever even after two times of movement, A indicates that though there was no rub-off whatsoever even after one time of movement, slight rub-off occurred after two times of movement, B indicates that there was slight rub-off, C indicates that there was rub-off and transfer onto the rear surface, and D indicates that there was considerable rub-off and transfer onto the rear surface. It is clear from Table 19, that when due to the containing of styrene, the total amount of acrylic acid and acrylates becomes less than 80%, the fixing property will not be excellent as a whole when the water dispersible polymer is used. It is also clear that the molecular weight of the polymer is preferably no less than 5000, more preferably no less than 10000, and even more preferably no less than 20000. Yet even more preferably, the polymer molecular weight is no less than 30000. Also, the polymer molecular weight is preferably no more than 300000 and more preferably no more than 200000.

TABLE 19

Fixing property and OD on specialized paper

| | Dispersions using polymers of different molecular weights in Production Example C1 Molecular weight × $10^4$ | | | | | |
|---|---|---|---|---|---|---|
| | 0.52 | 3.21 | 5.41 | 11.01 | 19.33 | 32.68 |
| OD | 1.8 | 2.2 | 2.5 | 2.6 | 2.31 | 2.0 |
| Resistance to rubbing | B | A | AA | AA | AA | B |

TABLE 19-continued

Fixing property and OD on specialized paper

| | Dispersions in which styrene was used in place of the benzyl methacrylate in Production Example C1 Molecular weight × $10^4$ | | | | | |
|---|---|---|---|---|---|---|
| | 0.55 | 3.10 | 5.23 | 10.21 | 20.13 | 30.11 |
| OD | 1.7 | 2.1 | 2.3 | 2.5 | 2.4 | 1.9 |
| Resistance to rubbing | C | B | A | A | A | C |

(Evaluation of Discoloration 1)

Polymers using styrene in place of benzyl acrylate in Production Examples C2, C3, and C4, were used to prepare Dispersions (Comparative Examples C1, C2, and C3), and these were evaluated for discoloration. Comparative Examples C1, C2, and C3 were prepared in the same manner as Production Examples C2, C3, and C4, respectively, except using styrene in place of benzyl acrylate.

Polymers using styrene in place of benzyl acrylate in Production Examples C6, C7, and C8, were used to prepare dispersions (Comparative Examples C4, C5, and C6), and these were evaluated for discoloration. Comparative Examples C4, C5, and C6 were prepared in the same manner as Production Examples C6, C7, and C8 respectively, except using styrene in place of benzyl acrylate.

For discoloration, gray patterns (of 3 levels differing in OD) were prepared using the cyan ink, magenta ink, and yellow ink of Production Examples C2 to C4 and Production Examples C6 to C8 (Comparative Examples C1 to C3 and Comparative Examples C4 to C6) and printed onto Xerox 4024 paper and Seiko Epson PM photo paper using the EM930C. The values of the color difference (ΔE) after leaving for 1 year under the conditions of 30° C. and 45% relative humidity are indicated as the evaluation results in Table 20 below. A smaller color difference indicates a better result.

TABLE 20

Evaluation results of discoloration

|  |  | Xerox4024 | | | PM photo paper | | |
|---|---|---|---|---|---|---|---|
| Production Examples C2, C3, C4 (benzyl acrylate) | OD | 0.31 | 0.55 | 0.72 | 0.42 | 0.62 | 0.88 |
|  | Percentage change in ΔE (%) | 2.2 | 1.5 | 1.0 | 2.1 | 1.3 | 0.9 |
| Comparative Examples C1, C2, C3 (styrene) | OD | 0.32 | 0.54 | 0.74 | 0.43 | 0.63 | 0.90 |
|  | Percentage change in ΔE (%) | 6.8 | 4.3 | 3.3 | 6.4 | 4.2 | 2.8 |
| Production Examples C6, C7, C8 (benzyl acrylate) | OD | 0.31 | 0.55 | 0.72 | 0.42 | 0.62 | 0.88 |
|  | Percentage change in ΔE (%) | 2.2 | 1.6 | 1.2 | 2.0 | 1.4 | 1.0 |
| Comparative Examples C4, C5, C6 (styrene) | OD | 0.32 | 0.54 | 0.74 | 0.43 | 0.63 | 0.90 |
|  | Percentage change in ΔE (%) | 8.0 | 6.4 | 3.4 | 8.2 | 6.2 | 3.1 |

It is clear from Table 20 that a significantly low discoloration can be secured by using a water-dispersible polymer, with which the total amount of acrylic acid and acrylates is made less than 80% as a result of having styrene as a monomer component. Also, this low discoloration is obtained regardless of the type of recording medium.

Example 4

The respective measurement values obtained for this Example were measured by the following methods.

(Measurement of the Refractive Index of the Dispersion Polymer)

The solvent and water were eliminated from the synthesized dispersion polymer to form a film-like sample and this was measured with the Abbe's refractometer, 3T.

(Sedimentation Percentage)

The sedimentation percentage is obtained from the peak value (fixed at 500 nm in the case of carbon black), which is obtained by placing a 1000-times diluted solution of the ink in a 1 cm cell and making a measurement in the range of 300 nm to 800 nm using the UV-visible spectrophotometer, U3300, made by Hitachi, Ltd., and is the value obtained by 1−(the absorbance after leaving still for 6 months in the ink state/the initial absorbance) and expressed in %.

(Evaluation of Fixing Property on Specialized Paper)

The fixing property was evaluated using specialized paper (PM photo paper) and observing the rubbing off of ink when a printed surface and a rear surface are overlapped with a load of 300 g and moved at a speed of 1 m/s.

The measurement of the molecular weight of each dispersion polymer, evaluation of the dispersion stability, measurement of the particle diameter, measurement of the percentage change in viscosity, measurement of OD, and measurement of glossiness were carried out by the same methods as those of Example 3.

(Production of Dispersions)

Dispersion D1 uses Monarch 880 (made by Cabot Corp.), which is a carbon black. After performing nitrogen replacement of the interior of a reaction vessel, equipped with a stirrer, thermometer, reflux tube, and dripping funnel, 65 parts of paracumylphenoxyethylene glycol acrylate, 10 parts of benzyl acrylate, 2 parts of acrylic acid, and 0.3 parts of t-dodecyl mercaptan were placed in the reaction vessel and heated to 70° C. Then 150 parts of paracumylphenoxyethylene glycol acrylate, 15 parts of acrylic acid, 5 parts of butyl acrylate, 1 part of t-dodecyl mercaptan, 20 parts of methyl ethyl ketone, and 1 part of azobisisobutyronitrile, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%.

40 parts of the abovementioned dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 μm membrane filter was carried out, thereby preparing dispersion D1. The polymer thus obtained had the refractive index of 1.55.

Dispersions D2 to D4 were obtained by the same method as the above. Dispersion D2 was prepared using Pigment Blue 15:3 (copper phthalocyanine pigment; made by Clariant, Ltd.) and adjusting the weight ratio of the pigment to polymer to 55:45. Dispersion D3 was prepared using Pigment Red 122 (dimethylquinacridone pigment; made by Clariant, Ltd.) and adjusting the weight ratio of the pigment to polymer to 75:25. Dispersion D4 was prepared using Pigment Yellow 180 (diketopyrrolopyrrole; made by Clariant, Ltd.) and adjusting the weight ratio of the pigment to polymer to 75:25.

(Preparation of Ink Jet Inks)

Favorable examples of compositions as ink jet recording ink are indicated below in Table 21, as specific examples of aqueous ink.

TABLE 21

Ink compositions

| | Production Examples | | | |
|---|---|---|---|---|
| | D1 | D2 | D3 | D4 |
| Dispersion D1 | 8 | — | — | — |
| Dispersion D2 | — | 7 | — | — |
| Dispersion D3 | — | — | 8 | — |
| Dispersion D4 | — | — | — | 8 |
| TEGmBE | 2 | 1 | 1 | 1 |
| 1,2-hexanediol | 3 | 4 | 4 | 4 |
| Glycerin | 10 | 15 | 10 | 10 |
| Trimethylolpropane | 4 | 7 | 5 | 5 |
| Surfynol 104 | 0.1 | 0.1 | 0.1 | 0.1 |
| Ion-exchanged water | Residual quantity | Residual quantity | Residual quantity | Residual quantity |

TEGmBE: triethylene glycol monobutyl ether
Surfynol 104: acetylene glycol surfactant, made by Nissin Chemical Industry Co., Ltd.

In Table 21, the added amount of dispersion is indicated with the amount thereof (solids concentration: total amount of pigment and dispersion polymer) converted to weight. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in each of the Examples.

(Evaluation of the Refractive Indices of Dispersion Polymers and Evaluation of OD on Regular Paper and Glossiness on Glossy Paper)

After synthesizing polymers with different refractive index, by changing types of monomers used therein, and dispersions were prepared in the same manners as described above with these polymers. Table 22 shows the evaluation results of OD on regular paper and glossiness on glossy paper, with respect to these dispersions. In addition to polymer I which uses paracumylphenoxyethylene glycol acrylate as in the present Example, polymer II which uses lauryl acrylate in place of paracumylphenoxyethylene glycol acrylate, and polymer III which uses 2-ethylhexyl acrylate in place of paracumylphenoxyethylene glycol acrylate were prepared in the same manner and with the other components being the same as dispersions D1 to D4, and inks were prepared using these dispersions in the same manner as the corresponding Production Examples.

Xerox 4024 paper (made by Xerox USA Corp.) was used as the regular paper and PM photo paper (made by Seiko Epson Co., Ltd.) was used as the glossy paper. The EM930C, made by Seiko Epson Co., Ltd., was used as the printer and evaluations were made using samples printed at 720 dpi photo quality in the case of the regular paper and samples printed at 1440 dpi photo quality in the case of the glossy paper.

TABLE 22

Refractive index of dispersion polymer and OD on regular paper and glossiness on glossy paper

| Production Example | Dispersion polymer | Refractive index of dispersion polymer | OD on regular paper | Glossiness on glossy paper |
|---|---|---|---|---|
| D1 | I | 1.55 | 1.45 | 70 |
|  | II | 1.44 | 1.37 | 45 |
|  | III | 1.46 | 1.39 | 48 |
| D2 | I | 1.55 | 1.25 | 80 |
|  | II | 1.44 | 1.18 | 50 |
|  | III | 1.46 | 1.18 | 51 |
| D3 | I | 1.55 | 1.25 | 81 |
|  | II | 1.44 | 1.15 | 49 |
|  | III | 1.46 | 1.15 | 52 |
| D4 | I | 1.55 | 1.3 | 80 |
|  | II | 1.44 | 1.18 | 46 |
|  | III | 1.46 | 1.19 | 54 |

As shown in Table 22, with all Production Examples using paracumylphenoxyethylene glycol acrylate, the refractive index was no less than 1.50 and both OD on regular paper and glossiness on glossy paper were excellent. In contrast, with all Production Examples using lauryl acrylate or 2-ethylhexyl acrylate in place of paracumylphenoxyethylene glycol acrylate, the refractive index was less than 1.50 and both OD on regular paper and glossiness on glossy paper were clearly poorer in comparison to the Production Examples using paracumylphenoxyethylene glycol acrylate. From the above, it is clear that a refractive index of no less than 1.50 is preferable and that a polymer with such a refractive index can be obtained as a copolymer of paracumylphenoxyethylene glycol acrylate and another acrylate or acrylic acid.

(Evaluation of Pigment Particle Diameter and Dispersion Stability)

Dispersions which differ in the particle diameter of the pigment were prepared in the same manner as described above and using these dispersions, inks were prepared in the same manner as the corresponding Production Examples. The percentage change in viscosity (%) and sedimentation percentage (%) upon leaving these inks at 60° C. for 30 days are shown in Table 23. It is clear from Table 23 that the pigment particle diameter is preferably no less than 20 nm and no more than 150 nm and preferably no less than 30 nm and no more than 100 nm.

TABLE 23

Evaluation of pigment particle diameter and dispersion stability

| Production Example | Pigment particle diameter (nm) | Percentage change of viscosity (%) | Sedimentation percentage (%) |
|---|---|---|---|
| D1 | 80 | 0.2 | 4.3 |
|  | 100 | 0.1 | 5.8 |
|  | 60 | 0.5 | 3.3 |
|  | 15 | 18.3 | 1.8 |
|  | 150 | 0.2 | 15.5 |
| D2 | 70 | 0.2 | 4.1 |
|  | 90 | 0.2 | 5.4 |
|  | 60 | 0.1 | 3 |
|  | 16 | 11 | 15 |
|  | 150 | 0.1 | 20.2 |
| D3 | 80 | 0.5 | 4.1 |
|  | 90 | 0.7 | 5.4 |
|  | 60 | 0.4 | 3 |
|  | 18 | 21.4 | 1.5 |
|  | 150 | 0.4 | 18.7 |
| D4 | 80 | 0.4 | 4.1 |
|  | 90 | 0.5 | 5.4 |
|  | 60 | 0.2 | 3 |
|  | 19 | 10.3 | 1.5 |
|  | 180 | 0.2 | 16.9 |

(Evaluation of Polymer Molecular Weight and Fixing Property on Glossy Paper)

Dispersions, using polymers of different molecular weights, were prepared by adjusting the polymerization conditions (synthesis time, amount of radical polymerization initiator, and reaction time) of the dispersion polymer in Production Example D1, and dispersions, using polymers with which the paracumylphenoxyethylene glycol acrylate in Production Example D1 is partially changed to another acrylate or methacrylate, were prepared and inks were prepared using these dispersions in the same manner as the corresponding Production Example. Table 24 shows the results of evaluation of fixing property on specialized paper using these inks.

TABLE 24

Evaluation of fixing property on glossy paper

| Production Example | Dispersion polymer | Molecular weight × $10^4$ | Fixing property on glossy paper |
|---|---|---|---|
| D1 | I | 0.41 | C |
|  | I | 1.12 | B |
|  | I | 3.1 | A |
|  | I | 1023 | A |
|  | I | 19.81 | B |
|  | II | 6.11 | C |
|  | III | 5.25 | C |
|  | IV | 8.57 | D |
|  | I | 20.13 | Could not be dispersed. |

The fixing property was evaluated visually. In Table 24, A indicates that there was no rub-off whatsoever even after two times of movement, B indicates that though there was no rub-off whatsoever even after one time of movement, slight rub-off occurred after two times of movement, C indicates that there was slight rub-off, and D indicates that there was rub-off Dispersion polymers I, II, and III are the same as those of Table 22, and with dispersion polymer IV, 2-ethylhexyl methacrylate was used in place of paracumylphenoxyethylene glycol acrylate. The other components were the same and synthesis was performed in the same manner as in the present Example in this case as well. The sample with which the molecular weight exceeded 200000 was difficult to disperse and could not be evaluated. The viscosity of the dispersion tended to increase when the molecular weight exceeded 100000.

Example 5

The respective measurement values obtained for this Example were measured by the following methods.

(Measurement of the Sulfur Content in a Polymer)

Each synthesized dispersion polymer was subject to elemental analysis using the 2400CHN Elemental Analyzer (made by Perkin Elmer Inc. (USA)) to measure the weight % of sulfur.

The measurement of the molecular weight of each dispersion polymer, evaluation of the dispersion stability, measurement of the particle diameter, measurement of the percentage change in viscosity, measurement of OD, and measurement of glossiness were carried out by the same methods as those of Example 53, and the measurement of the refractive index of each dispersion polymer, the evaluation of the sedimentation percentage, and the evaluation of fixing property on specialized paper were carried out by the same methods as those of Example 4.

(Production of Dispersions)

Dispersion E1 uses Monarch 880 (made by Cabot Corp.), which is a carbon black. After performing nitrogen replacement of the interior of a reaction vessel, equipped with a stirrer, thermometer, reflux tube, and dripping funnel, 25 parts of phenyl thiomethacrylate, 20 parts of benzyl acrylate, 2 parts of acrylic acid, and 0.3 parts of t-dodecyl mercaptan were placed in the reaction vessel and heated to 80° C. Then 50 parts of phenyl thiomethacrylate, 40 parts of benzyl acrylate, 15 parts of acrylic acid, 5 parts of butyl acrylate, 1 part of t-dodecyl mercaptan, 20 parts of methyl ethyl ketone, and 1 part of azobisisobutyronitrile, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%.

40 parts of the abovementioned dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 µm membrane filter was carried out, thereby preparing dispersion E1. The polymer thus obtained had the refractive index of 1.58.

Dispersions E2 to E4 were obtained by the same method as the above. Dispersion E2 was prepared using Pigment Blue 15:4 (copper phthalocyanine pigment; made by Clariant, Ltd.) and adjusting the weight ratio of the pigment to polymer to 55:45. Dispersion E3 was prepared using Pigment Red 122 (dimethylquinacridone pigment; made by Clariant, Ltd.) and adjusting the weight ratio of the pigment to polymer to 75:25. Dispersion E4 was prepared using Pigment Yellow 74 (condensed azo pigment; made by Clariant, Ltd.) and adjusting the weight ratio of the pigment to polymer to 75:25.

(Preparation of Ink Jet Inks)

Favorable examples of compositions as ink jet recording ink are indicated below in Table 25, as specific examples of aqueous ink. In Table 25, the added amount of dispersion is indicated with the amount thereof (solids concentration: total amount of pigment and dispersion polymer) converted to weight. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in each of the Examples.

TABLE 25

Ink compositions

| | Production Examples | | | |
|---|---|---|---|---|
| | E1 | E2 | E3 | E4 |
| Dispersion E1 | 8.5 | — | — | — |
| Dispersion E2 | — | 7.5 | — | — |
| Dispersion E3 | — | — | 8 | — |
| Dispersion E4 | — | — | — | 8 |
| TEGmBE | 2 | 1 | 1 | 1 |
| 1,2-hexanediol | 3 | 4 | 4 | 4 |
| Glycerin | 10 | 15 | 10 | 10 |
| Trimethylolpropane | 4 | 7 | 5 | 5 |
| Surfynol 104 | 0.1 | 0.1 | 0.1 | 0.1 |
| Ion-exchanged water | Residual quantity | Residual quantity | Residual quantity | Residual quantity |

TEGmBE: triethylene glycol monobutyl ether
Surfynol 104: acetylene glycol surfactant, made by Nissin Chemical Industry Co., Ltd.

(Evaluation of the Refractive Indices of Dispersion Polymers and Evaluation of OD on Regular Paper and Glossiness on Glossy Paper)

After synthesizing polymers with different refractive index, by changing types of monomers used therein, and dispersions were prepared in the same manners as described above with these polymers. Table 26 shows the evaluation results of OD on regular paper and glossiness on glossy paper, with respect to these dispersions. In addition to polymer I which uses phenyl thiomethacrylate as in the present Example, polymer II which uses lauryl acrylate in place of phenyl thiomethacrylate, and polymer III which uses 2-ethylhexyl acrylate in place of phenyl thiomethacrylate, were prepared in the same manner and with the other components being the same as dispersions E1 to E4, and inks were prepared using these dispersions in the same manner as the corresponding Production Examples.

Xerox 4024 paper (made by Xerox USA Corp.) was used as the regular paper and PM photo paper (made by Seiko Epson Co., Ltd.) was used as the glossy paper. The EM930C, made by Seiko Epson Co., Ltd., was used as the printer and evaluations were made using samples printed at 720 dpi photo quality in the case of the regular paper and samples printed at 1440 dpi photo quality in the case of the glossy paper.

TABLE 26

Refractive index of dispersion polymer and OD on regular paper and glossiness on glossy paper

| Production Example | Dispersion polymer | Refractive index of dispersion polymer | OD on regular paper | Glossiness on glossy paper |
|---|---|---|---|---|
| E1 | I | 1.58 | 1.46 | 74 |
|  | II | 1.45 | 1.36 | 47 |
|  | III | 1.47 | 1.38 | 49 |
| E2 | I | 1.58 | 1.27 | 83 |
|  | II | 1.45 | 1.17 | 51 |
|  | III | 1.47 | 1.17 | 53 |
| E3 | I | 1.58 | 1.28 | 85 |
|  | II | 1.45 | 1.15 | 51 |
|  | III | 1.47 | 1.14 | 53 |
| E4 | I | 1.58 | 1.33 | 84 |
|  | II | 1.45 | 1.16 | 48 |
|  | III | 1.47 | 1.17 | 56 |

As shown in Table 26, with all Production Examples using phenyl thiomethacrylate, the refractive index was no less than 1.50 and both OD on regular paper and glossiness on glossy paper were excellent. In contrast, with all Production Examples using lauryl acrylate or 2-ethylhexyl acrylate in place of phenyl thiomethacrylate, the refractive index was less than 1.50 and both OD on regular paper and glossiness on glossy paper were clearly poorer in comparison to the Production Examples using phenyl thiomethacrylate. From the above, it is clear that a refractive index of no less than 1.50 is preferable, and that a polymer with such a refractive index can be obtained as a copolymer of phenyl thiomethacrylate and another acrylate or acrylic acid.

(Evaluation of Pigment Particle Diameter and Dispersion Stability)

Dispersions which differ in the particle diameter of the pigment were prepared in the same manner as described above and using these dispersions, inks were prepared in the same manner as the corresponding Production Examples. The percentage change in viscosity (%) and sedimentation percentage (%) upon leaving these inks at 60° C. for 30 days are shown in Table 27.

TABLE 27

Evaluation of pigment particle diameter and dispersion stability

| Production Example | Pigment particle diameter (nm) | Percentage change of viscosity (%) | Sedimentation percentage (%) |
|---|---|---|---|
| E1 | 80 | 0.1 | 4.2 |
|  | 100 | 0.1 | 5.7 |
|  | 60 | 0.3 | 3.2 |
|  | 15 | 17.3 | 1.7 |
|  | 150 | 0.1 | 17.3 |
| E2 | 70 | 0.2 | 4.3 |
|  | 90 | 0.2 | 5.5 |
|  | 60 | 0.2 | 3.2 |
|  | 16 | 12.1 | 1.6 |
|  | 150 | 0.1 | 22.2 |
| E3 | 80 | 0.4 | 4.6 |
|  | 90 | 0.6 | 5.4 |
|  | 60 | 0.3 | 3.5 |
|  | 18 | 20.4 | 1.5 |
|  | 150 | 0.3 | 19.7 |
| E4 | 80 | 0.3 | 4.3 |
|  | 90 | 0.4 | 5.6 |
|  | 60 | 0.2 | 3.5 |
|  | 19 | 11.5 | 1.4 |
|  | 180 | 0.2 | 17.4 |

It is clear from Table 27 that the pigment particle diameter is preferably no less than 20 nm and no more than 150 nm and preferably no less than 30 nm and no more than 100 nm.

(Evaluation of Polymer Molecular Weight and Fixing Property on Glossy Paper)

Dispersions, using polymers of different molecular weights, were prepared by adjusting the polymerization conditions (synthesis time, amount of radical polymerization initiator, and reaction time) of the dispersion polymer in Production Example E1, and dispersions, using polymers with which the phenyl thiomethacrylate in ink composition example 1 was partially changed to another acrylate or methacrylate, were prepared, and inks were prepared using these dispersions in the same manner as the corresponding Production Example. The results of evaluation of fixing property on specialized paper using these inks are shown in Table 28. The fixing property was evaluated visually. In Table 28, A indicates that there was no rub-off whatsoever even after two times of movement, B indicates that though there was no rub-off whatsoever even after one time of movement, slight rub-off occurred after two times of movement, C indicates that there was slight rub-off, and D indicates that there was rub-off. When a monomer other than paracumylphenoxyethylene glycol acrylate was used, adequate fixing property on glossy paper became difficult to obtain.

TABLE 28

Evaluation of fixing property on glossy paper

| Production Example | Dispersion polymer | Molecular weight × $10^4$ | Fixing property on glossy paper |
|---|---|---|---|
| E1 | I | 0.44 | C |
|  | I | 1.22 | B |
|  | I | 3.5 | A |
|  | I | 10.89 | A |
|  | I | 19.85 | B |
|  | II | 6.15 | C |
|  | III | 5.35 | C |
|  | IV | 8.24 | D |
|  | I | 21.37 | Could not be dispersed. |

Dispersion polymers I, II, and III are the same as those of Table 26, and with dispersion polymer IV, 2-ethylhexyl methacrylate was used in place of phenyl thiomethacrylate. The other components were the same, synthesis was performed in the same manner as in dispersion E1, and an ink was prepared using the synthesized dispersion in the same manner as the corresponding Production Example in this case as well. The sample with which the molecular weight exceeded 200000 was difficult to disperse and could not be evaluated. The viscosity of the dispersion tended to increase when the molecular weight exceeded 100000. The molecular weight is preferably no less than 10000, more preferably no less than 20000 or no less than and 30000, and preferably no more than 100000.

Example 6

(Production of Dispersions)

Monarch 880 (made by Cabot Corp.), which is a carbon black, was used as the pigment in dispersion F1. After performing nitrogen replacement of the interior of a reaction vessel, equipped with a stirrer, thermometer, reflux tube, and dripping funnel, the monomer composition shown in Table 1 and 20 parts of benzyl acrylate, 15 parts of 2-ethylhexyl acrylate, 15 parts of butyl acrylate, 10 parts of lauryl acrylate, 2 parts of acrylic acid, and 0.3 parts of t-dodecyl mercaptan were placed in the reaction vessel and heated to 70° C., and then 50 parts of benzyl acrylate, 15 parts of 2-ethylhexyl acrylate, 15 parts of acrylic acid, 50 parts of the urethane acrylate, CN961 (made by Nippon Kayaku Co., Ltd.), 1 part of t-dodecyl mercaptan, 120 parts of methyl ethyl ketone, and 1 part of azobisisovaleronitrile, which were prepared separately, were placed in the dripping funnel and dripped into the reaction vessel over a period of 4 hours to carry out a polymerization reaction of a polymer. Methyl ethyl ketone was then added to the reaction vessel to prepare a polymer solution of a concentration of 40%. The molecular weight dispersion (Mw/Mn) of the polymer was 3.1, and the styrene-equivalent number average molecular weight was $10.21 \times 10^4$. The content of the urethane bonds, urea bonds, allophanate bonds, and biuret bonds at this point was 1.0 mmol/g.

The molecular weight of the polymer was determined by the method described for Example 3 and the quantification of the urethane bonds, etc., was carried out by the following method.

(Measurement of the Urethane Bonds, Urea Bonds, Allophanate Bonds, and Biuret Bonds)

An excess amount of n-butylamine was added to the synthesized polymer, and after leaving at 40° C. for 24 hours, back titration using an HCl solution of 0.1% concentration was performed to cut the crosslinking allophanate and biuret groups. This amine-treated polymer, including the urethane and urea produced as a result of decomposition by the amine, was measured by GC-MS and the total amount and respective amounts of urethane bonds, urea bonds, allophanate bonds, and biuret bonds were calculated.

40 parts of the abovementioned polymer solution, 30 parts of Monarch 880 (made by Cabot Corp.), 100 parts of 0.1 mol/L sodium hydroxide aqueous solution, and 30 parts of methyl ethyl ketone were then mixed and stirred for 30 minutes in a homogenizer. Thereafter, 300 parts of ion-exchanged water were added and stirring was performed for another hour. The entire amount of methyl ethyl ketone and a part of the water were then distilled off using a rotary evaporator, the pH was adjusted to 9 by neutralization by a 0.1 mol/L sodium hydroxide aqueous solution, and filtration through a 0.3 µm membrane filter was carried out, thereby preparing dispersion F1 (containing a polymer-coated pigment), having a solids content (dispersion polymer and carbon black) of 20%. Dispersions F2 to F4 were obtained by the same method as the above. Each dispersion was prepared so that the weight ratio of the dispersion polymer and the pigment will be 20:80. Table 29 shows the synthesis components and the various measurement results for dispersions F1 to F8.

For dispersion F2, Pigment Blue 15:3 (copper phthalocyanine pigment; made by Clariant, Ltd.) was used as the pigment. The polymer was synthesized in the same manner as the Production Example of dispersion F1, except changing the amount of urethane acrylate. The molecular weight dispersion (Mw/Mn) of the synthesized polymer was 3.0, and the styrene-equivalent number average molecular weight was $5.62 \times 10^4$. Also, the content of the urethane bonds, urea bonds, allophanate bonds, and biuret bonds at this point was 0.8 mmol/g.

For dispersion F3, Pigment Red 122 (dimethylquinacridone pigment; made by Clariant, Ltd.) was used as the pigment. The polymer was synthesized in the same manner as the Production Example of dispersion F1, except changing the amount of urethane acrylate. The molecular weight dispersion (Mw/Mn) of the synthesized polymer was 3.0, and the styrene-equivalent number average molecular weight was $5.96 \times 10^4$. Also, the content of the urethane bonds, urea bonds, allophanate bonds, and biuret bonds at this point was 1.2 mmol/g.

For dispersion F4, Pigment Yellow 180 (diketopyrrolopyrrole; made by Clariant, Ltd.) was used as the pigment. The polymer was synthesized in the same manner as the Production Example of dispersion F1, except changing the amount of urethane acrylate. The molecular weight dispersion (Mw/Mn) of the synthesized polymer was 3.5, and the styrene-equivalent number average molecular weight was $5.82 \times 10^4$. Also, the content of the urethane bonds, urea bonds, allophanate bonds, and biuret bonds at this point was 1.2 mmol/g.

For dispersion F5, the polymer was synthesized in the same manner as the Production Example of dispersion F1, except using a mixture of 50% benzyl acrylate and 50% isobornyl acrylate in place of benzyl acrylate, using Leben C (made by Columbian Carbon Ltd.), which is a carbon black, in place of using Monarch 880 (made by Cabot Corp.), which is a carbon black, and changing the amount of urethane acrylate. The molecular weight dispersion (Mw/Mn) of the synthesized polymer was 3.5, and the styrene-equivalent number average molecular weight was $7.35 \times 10^4$. Also, the content of the urethane bonds, urea bonds, allophanate bonds, and biuret bonds at this point was 1.0 mmol/g.

For dispersion F6, Pigment Blue 15:3 (copper phthalocyanine pigment; made by Clariant, Ltd.) was used as the pigment. The polymer was synthesized in the same manner as the Production Example of dispersion F1, except changing the amount of urethane acrylate. The molecular weight dispersion (Mw/Mn) of the synthesized polymer was 3.0, and the styrene-equivalent number average molecular weight was $7.58 \times 10^4$. Also, the content of the urethane bonds, urea bonds, allophanate bonds, and biuret bonds at this point was 0.9 mmol/g.

For dispersion F7, Pigment Red 122 (dimethylquinacridone pigment; made by Clariant, Ltd.) was used as the pigment. The polymer was synthesized in the same manner as the Production Example of dispersion F5, except changing the amount of urethane acrylate. The molecular weight dispersion (Mw/Mn) of the synthesized polymer was 3.0, and the styrene-equivalent number average molecular weight was $4.24 \times 10^4$. Also, the content of the urethane bonds, urea bonds, allophanate bonds, and biuret bonds at this point was 1.2 mmol/g.

For dispersion F8, Pigment Yellow 180 (diketopyrrolopyrrole; made by Clariant, Ltd.) was used as the pigment. The polymer was synthesized in the same manner as the Production Example of dispersion F5, except changing the amount of urethane acrylate. The molecular weight dispersion Mw/Mn) of the synthesized polymer was 3.5, and the styrene-equivalent number average molecular weight was $6.13 \times 10^4$. Also, the content of the urethane bonds, urea bonds, allophanate bonds, and biuret bonds at this point was 1.3 mmol/g.

TABLE 29

Compositions of the dispersions

|  | Dispersion F1 | Dispersion F2 | Dispersion F3 | Dispersion F4 | Dispersion F5 | Dispersion F6 | Dispersion F7 | Dispersion F8 |
|---|---|---|---|---|---|---|---|---|
| Benzyl acrylate | 20 | 20 | 20 | 20 | 10 | 10 | 10 | 10 |
| Isobornyl acrylate | — | — | — | — | 10 | 10 | 10 | 10 |
| 2-ethylhexyl acrylate | 15 | 15 | 15 | 15 | 15 | 15 | 15 | 15 |
| Butyl acrylate | 15 | 15 | 15 | 15 | 15 | 15 | 15 | 15 |
| Lauryl acrylate | 10 | 10 | 10 | 10 | 10 | 10 | 10 | 10 |
| Acrylic acid | 2 | 2 | 2 | 2 | 2 | 2 | 2 | 2 |
| Benzyl acrylate | 50 | 50 | 50 | 50 | 25 | 25 | 25 | 25 |
| Isobornyl acrylate | — | — | — | — | 25 | 25 | 25 | 25 |
| 2-ethylhexyl acrylate | 15 | 15 | 15 | 15 | 15 | 15 | 15 | 15 |
| Acrylic acid | 15 | 15 | 15 | 15 | 15 | 15 | 15 | 15 |
| Urethane acrylate CN961 | 50 | 50* | 50* | 50* | 50* | 50* | 50* | 50* |
| Number average molecular weight × 10$^4$ | 5.23 | 5.62 | 5.96 | 5.82 | 7.35 | 7.58 | 4.24 | 6.13 |
| Dispersion Mw/Mn | 3.1 | 3 | 3 | 3.5 | 3.5 | 3 | 3 | 3.5 |
| Amount of urethane bonds | 1 | 0.8 | 1.2 | 1.2 | 1 | 0.9 | 1.2 | 1.3 |

50*: The added amount was varied by a small amount.

(Preparation of Ink Jet Inks)

Examples of compositions that are favorable as ink jet recording ink are indicated in Table 30 as specific examples of aqueous ink. In Table 30, the added amount of dispersion is indicated with the amount thereof (solids concentration: total amount of pigment and dispersion polymer) converted to weight. 0.05% Topside 240 (made by Permachem Asia Ltd.) in ion-exchanged water for prevention of corrosion of ink, 0.02% benzotriazole in ion-exchanged water for prevention of corrosion of ink jet head parts, and 0.04% EDTA (ethylenediamine tetraacetic acid).2Na salt in ion-exchanged water for reducing the effects of metal ions in the ink system were used in the residual quantity of water in Table 30. Based on the compositions of Table 2, the ink jet inks of Production Examples F1 to F8 were prepared from dispersions F1 to F8, respectively.

TABLE 30

Ink compositions

Ink

|  | F1 | F2 | F3 | F4 | F5 | F6 | F7 | F8 |
|---|---|---|---|---|---|---|---|---|
| Dispersion F1 | 7.5 | — | — | — | — | — | — | — |
| Dispersion F2 | — | 4 | — | — | — | — | — | — |
| Dispersion F3 | — | — | 6.5 | — | — | — | — | — |
| Dispersion F4 | — | — | — | 6 | — | — | — | — |
| Dispersion F5 | — | — | — | — | 8 | — | — | — |
| Dispersion F6 | — | — | — | — | — | 5 | — | — |
| Dispersion F7 | — | — | — | — | — | — | 6 | — |
| Dispersion F8 | — | — | — | — | — | — | — | 8 |
| TEGmBE | 2 | 1 | 1 | 1 | 2 | 1 | 1 | 1 |
| 1,2-hexanediol | 3 | 4 | 4 | 4 | 3 | 4 | 4 | 4 |
| Glycerin | 10 | 15 | 10 | 10 | 10 | 13 | 10 | 7 |
| Trimethylolpropane | 4 | 7 | 5 | 5 | 4 | 7 | 5 | 5 |
| Surfynol 104 | 0.1 | 0.1 | 0.1 | 0.1 | 0.1 | 0.1 | 0.1 | 0.1 |
| Ion-exchanged water | Residual quantity | Residual quantity | Residual quantity | Residual quantity | Residual quantity | Residual quantity | Residual quantity | Residual quantity |

TEGmBE: triethylene glycol monobutyl ether (Evaluation of Ink Jet Inks)

(1) The Urethane Bonds, Urea Bonds, Allophanate Bonds, and Biuret Bonds of a Polymer and Dispersion Stability and Fixing Property Dispersion stability and fixing property on specialized paper were measured for Production Examples F1 to F8 and Production Examples FA1 to FA20. Production Examples FA1 to FA2 were prepared in the same procedures as those of the Production Example of dispersion F1, except using separately synthesized acrylates, containing urethane bonds, urea bonds, allophanate bonds, and biuret bonds, in place of the urethane acrylate used in dispersion F1, to synthesize polymers that are variously differed in the amounts of the above-mentioned bonds, based on the composition of Production Example F1 shown in Table 30. With these Production Examples, dispersion stability and fixing property on specialized paper were evaluated. Measurements concerning dispersion stability and fixing property were made as follows. The results are shown in Table 31.

(Evaluation of Dispersion Stability)

The percentage change in viscosity (%) upon leaving each ink at 60° C. for 30 days was measured as an index of dispersion stability. A smaller percentage change in viscosity indicates higher stability. For the percentage change in viscosity, viscosity values were measured at an angle of 60° using the AMVn, made by Anton Paar GmbH, and 1−(value after 30 days)/(initial value) was indicated in the form of percentage (%).

(Evaluation of Fixing Property on Specialized Paper)

The fixing property was evaluated using specialized paper (PM photo paper, made by Seiko Epson Co., Ltd.) and observing the rubbing off of ink when a printed surface and a rear surface are overlapped with a load of 300 g and moved at a speed of 30 cm/s. AA is used to indicate that there was no rub-off whatsoever even after two times of movement, A is used to indicate that though there was no rub-off whatsoever even after one time of movement, slight rub-off occurred after two times of movement, B is used to indicate that there was slight rub-off, C is used to indicate that there was rub-off and transfer onto the rear surface, and D is used to indicate that there was considerable rub-off and transfer onto the rear surface.

TABLE 31

Various bond amounts and dispersion stability and fixing property on specialized paper

| Ink | Urethane mmol/g | Urea mmol/g | Allophanate mmol/g | Biuret mmol/g | Dispersion stability (percentage change in viscosity (%)) | Fixing property on specialized paper |
|---|---|---|---|---|---|---|
| F1 | 1.0 | 0.0 | 0 | 0 | 0.01 | A |
| F2 | 0.8 | 0.0 | 0 | 0 | 0.1 | A |
| F3 | 1.2 | 0.0 | 0 | 0 | 0.05 | A |
| F4 | 1.2 | 0.0 | 0 | 0 | 0.1 | A |
| F5 | 1.0 | 0.0 | 0 | 0 | 0.1 | A |
| F6 | 0.9 | 0.0 | 0 | 0 | 0.05 | A |
| F7 | 1.2 | 0.0 | 0 | 0 | 0.05 | A |
| F8 | 1.3 | 0.0 | 0 | 0 | 0.1 | A |
| FA1 | 0.1 | 0.0 | 0 | 0 | 0.1 | A |
| FA2 | 0.1 | 0.1 | 0 | 0 | 0.1 | A |
| FA3 | 0.5 | 0.0 | 0.1 | 0 | 0.2 | A |
| FA4 | 0.3 | 0.2 | 0 | 0.1 | 0.1 | A |
| FA5 | 10.0 | 0.0 | 0 | 0 | 0.1 | A |
| FA6 | 1.0 | 0.1 | 0 | 0 | 0.3 | A |
| FA7 | 0.5 | 0.0 | 0.1 | 0 | 0.2 | A |
| FA8 | 0.5 | 0.1 | 0 | 0.05 | 0.1 | A |
| FA9 | 2.0 | 0.0 | 1 | 0 | 1.4 | N.T. |
| FA10 | 2.0 | 0.0 | 0.5 | 0 | 1 | N.T. |
| FA11 | 1.0 | 2.0 | 0.5 | 0.5 | 1.5 | N.T. |
| FA12 | 0.09 | 0 | 0 | 0 | 1 | B |
| FA13 | 0.05 | 0.02 | 0 | 0 | 0.2 | C |
| FA14 | 0.05 | 0.02 | 0 | 0.01 | 1 | C |
| FA15 | 10.1 | 0 | 0 | 0 | 35 | A |
| FA16 | 5.0 | 3.0 | 2 | 1 | 86 | A |
| FA17 | 5.0 | 5.0 | 0 | 0.5 | 103 | A |
| FA18 | 2.0 | 0.0 | 1.1 | 0 | 250 | N.T. |
| FA19 | 2.0 | 1.0 | 1 | 0.1 | 231 | N.T. |
| FA20 | 1.0 | 2.0 | 0.1 | 1 | 351 | N.T. |

N.T.: Not Tested

Production Examples F1 to F8 contain just urethane bonds and do not contain urea bonds, allophanate bonds, nor biuret bonds. As shown in Table 31, these Production Examples F1 to F8 exhibit high dispersion stability with a total amount of the four types of bonds (practically the amount of urethane bonds) being no less than 0.8 mmol/g and no more than 1.3 mmol/g. These also exhibited good fixing properties on specialized paper.

Also in regard to the dispersion stability of FA1 to FA20 in relation to the amount of allophanate bonds and biuret bonds, whereas fairly good dispersion stability is exhibited with a bond amount of no more than 1.0 mmol/g, extremely poor dispersion stability is exhibited when 1.0 mmol/g is exceeded. Meanwhile, in regard to the total amount of urethane bonds, urea bonds, allophanate bonds, and biuret bonds, excellent dispersion stability is exhibited at no more than 10.0 mmol/g and the dispersion stability degrades clearly when 10.0 mmol/g is exceeded. From the above, it is clear that the total amount of allophanate bonds and biuret bonds is preferably no more than 1.0 mmol/g and the total amount of urethane bonds, urea bonds, allophanate bonds, and biuret bonds is preferably no more than 10.0 mmol/g. Also from the results of Production Examples F1 to F8 and Production Examples FA1 to FA11, it is clear that the total amount of allophanate bonds and biuret bonds is preferably no more than 0.1 mmol/g.

In regard to the fixing properties on specialized paper of FA1 to FA8 and FA12 to FA17 in relation to the four types of bonds and biuret bonds, whereas the fixing property is high when the total amount of the four bonds is high and good fixing property is secured when this amount is no less than 0.1 mol/g, the fixing property degrades significantly at less than 0.1 mmol/g.

(2) Styrene-Equivalent Number Average Molecular Weight of a Polymer and Dispersion Stability A plurality of polymers, which are differed in styrene-equivalent number average molecular weight and dispersion Mw/Mn, were synthesized by differing the synthesis time and amount of radical polymerization initiator, and by using one type or combining two or more types of these polymers and making the particle diameters of pigment-enclosing particles differ in performing mixing based on the composition of the ink of Production Example F1 of Table 30, Production Examples FB1 to FB15 of 15 subtypes of ink, with which various molecular weights and dispersions and various particle diameters are combined, were prepared. The percentage change in viscosity was measured for each of these Production Examples FB1 to FB15 of subtype inks of ink 1 and Production Examples F2 to F8. The results are shown below. The molecular weights shown in Table 32 are styrene-equivalent number average molecular weights. The particle diameters of the polymer-coated pigment particles in the respective inks were measured using the Zetasizer 3000HS (made by Malvern Instruments, Inc. (UK)).

TABLE 32

Number average molecular weight, dispersion, and particle diameter and dispersion stability

|   | Ink | Number average molecular weight × $10^4$ | Mw/MN | Particle diameter (nm) | Dispersion stability (percentage change in viscosity (%)) |
|---|---|---|---|---|---|
| F1 | FB1 | 0.51 | 3.1 | 100 | 40 |
|  | FB2 | 1.12 | 3.1 | 100 | 20.1 |
|  | FB3 | 3.1 | 3.1 | 100 | 0.2 |
|  | FB4 | 5.23 | 3.1 | 100 | 0.2 |
|  | FB5 | 10.21 | 1.3 | 100 | 20 |
|  | FB6 | 10.21 | 2.2 | 100 | 1 |
|  | FB7 | 10.21 | 3.1 | 100 | 0.01 |
|  | FB8 | 10.21 | 3.1 | 15 | 132 |
|  | FB9 | 10.21 | 3.2 | 20 | 50.1 |
|  | FB10 | 10.21 | 5.3 | 300 | 80.5 |
|  | FB11 | 10.21 | 10.5 | 100 | 1 |
|  | FB12 | 10.21 | 11.3 | 100 | 20 |
|  | FB13 | 20.13 | 3.1 | 100 | 240.4 |
|  | FB14 | 25.2 | 3.1 | 100 | 350.5 |
|  | FB15 | 30.11 | 3.1 | 100 | 810 |
| F2 |  | 5.62 | 3 | 90 | 0.01 |
| F3 |  | 5.96 | 3 | 95 | 0.1 |
| F4 |  | 5.82 | 3.5 | 100 | 0.05 |
| F5 |  | 7.35 | 3.5 | 100 | 0.1 |
| F6 |  | 7.58 | 3 | 90 | 0.1 |
| F7 |  | 4.24 | 3 | 95 | 0.05 |
| F8 |  | 6.13 | 3.5 | 100 | 0.05 |

It is clear from Table 32 that good dispersion stability will be exhibited when the number average molecular weight of the polymer is within the range of no less than $2 \times 10^4$, and no more than $10 \times 10^4$ and good dispersion stability will be exhibited when the dispersion is within the range of no less than 2.0 and no more than 10.5. It is also clear that the number average molecular weight is preferably no less than $3 \times 10^4$ and the dispersion is more preferably no less than 3.0 and no more than 4.0.

(3) Evaluation of Fixing Property and OD on Specialized Paper

The conditions for polymer polymerization (synthesis time and amount of radical polymerization initiator) in the production of dispersion F1 were adjusted to synthesize 6 types of polymers that differ in number average molecular weight and prepare various dispersions, and Production Examples FC1 to FC6 of inks were prepared based on the composition of Production Example F1 shown in Table 30. These Production Examples FC1 to FC6 were subject to measurements of fixing property and OD on specialized paper. Also, except using styrene in place of urethane acrylate in the Production Example of dispersion F1, the same procedures as those of the production of dispersion F1 were carried out to synthesize 6 types of polymers that differ in number average molecular weight and prepare various dispersions to thereby prepare Production Examples FD1 to FD6 of inks based on the composition of Production Example F1 of Table 30. These Production Examples were subject to the measurement of fixing property and OD on specialized paper. The OD values were measured as described below. The results are shown in Table 33.

(Measurement of OD)

L*, a*, and b* were measured using the Gretag Macbeth Spectroscan SPM-50 (made by Gretag Corp.) and OD value was calculated as the scalar value of these measured values.

TABLE 33

OD and fixing property on specialized paper

|  | FC1 | FC2 | FC3 | FC4 | FC5 | FC6 |
|---|---|---|---|---|---|---|
|  | Number average molecular weight × $10^4$ | | | | | |
|  | 0.52 | 3.21 | 5.41 | 11.01 | 19.33 | 32.68 |
| OD | 1.8 | 2.2 | 2.5 | 2.6 | 2.3 | 2 |
| Fixing property on specialized paper | B | A | AA | AA | AA | B |

|  | FD1 | FD2 | FD3 | FD4 | FD5 | FD6 |
|---|---|---|---|---|---|---|
|  | Number average molecular weight × $10^4$ | | | | | |
|  | 0.55 | 3.1 | 5.23 | 10.21 | 20.13 | 30.11 |
| OD | 1.7 | 2.1 | 2.3 | 2.5 | 2.4 | 1.9 |
| Fixing property on specialized paper | C | B | A | A | A | C |

As shown in Table 33, with Production Examples FC1 to FC6, the fixing property and OD on specialized paper were both good when the number average molecular weight was in the range of no less than $2 \times 10^4$ and no more than $20 \times 10^4$. Meanwhile, with Production Examples FD1 to FD6, which use styrene, though a favorable OD is obtained when the number average molecular weight was in the range of no less than $5 \times 10^4$ and no more than $20 \times 10^4$, the fixing property on specialized paper was poor in comparison to FC1 to FC6. It is thus clear that aromatic vinyl monomers, such as styrene, lower the fixing property.

Each Disclosure of Japanese Patent Application No. 2003-103473 (filed on Apr. 7, 2003), Japanese Patent Applications No. 2003-173345 (filed on Jun. 18, 2003), No. 2003-359294 (filed on Oct. 20, 2003), No. 2004-023934 (filed on Jan. 30, 2004), No. 2004-036268 (filed on Feb. 13, 2004), No. 2004-048025 (filed on Feb. 24, 2004), and No. 2004-111115 (filed on Apr. 5, 2004), each of which is including specification, drawings, and claims are incorporated herein by reference in their entirely.

The invention claimed is:

1. An aqueous ink composition comprising:
 a pigment, having a particle diameter as determined by the light scattering method of no less than 20 nm and no more than 200 nm; and
 a water dispersible polymer, having a styrene-equivalent number average molecular weight as determined by gel permeation chromatography of no less than 5000 and no more than 200000, wherein
 said water dispersible polymer is a copolymer of monomers, said monomers comprising acrylic acid, methacrylic acid, and benzyl acrylate monomers in an amount of no less than 80 weight % of the total monomer weight.

2. An aqueous ink composition comprising:
 a pigment, having a particle diameter as determined by the light scattering method of no less than 20 nm and no more than 150 nm; and
 a water dispersible polymer, being a copolymer of monomers, and having a styrene-equivalent number average molecular weight as determined by gel permeation chromatography of no less than 10000 and no more than 200000, said monomers comprising acrylic acid, methacrylic acid, and benzyl acrylate monomer at an amount of no less than 80 weight % of the total monomer weight, and
 wherein the aqueous ink composition has a surface tension of no less than 20 mN/m and no more than 40 mN/m.

3. An aqueous ink composition, comprising:
a pigment, having a particle diameter as determined by the light scattering method of no less than 20 nm and no more than 200 nm; and
a water dispersible polymer, having a styrene-equivalent number average molecular weight as determined by gel permeation chromatography of no less than 5000 and no more than 200000, wherein
said water dispersible polymer is a copolymer of monomers,
wherein said monomers comprise benzyl acrylate and/or benzyl methacrylate monomers at an amount of no less than 40 weight % and no more than 80 weight % of the total monomer weight, and wherein said monomers, in addition to the benzyl monomers, comprise acrylic acid and methacrylic acid monomers.

4. The aqueous ink composition according to claim 3, wherein said pigment includes a polymer-coated pigment that is coated with said water dispersible polymer.

5. An aqueous ink composition comprising:
a pigment, having a particle diameter as determined by the light scattering method of no less than 20 nm and no more than 200 nm; and a water dispersible polymer, having a styrene-equivalent number average molecular weight as determined by gel permeation chromatography of no less than 5000 and no more than 200000, wherein said water dispersible polymer is a copolymer of monomers, wherein said monomers comprising acrylate and acrylic acid monomers at an amount of no less than 80 weight % of the total monomer weight, and wherein said monomers further comprise methacrylic acid.

6. The aqueous ink composition according to claim 5, wherein said pigment includes a polymer-coated pigment that is coated with said water dispersible polymer.

7. An aqueous ink composition, comprising:
a pigment, having a particle diameter as determined by the light scattering method of no less than 20 nm and no more than 200 nm; and
a water dispersible polymer, having a styrene-equivalent number average molecular weight as determined by gel permeation chromatography of no less than 5000 and no more than 200000, wherein said water dispersible polymer is a copolymer of monomers, including acrylate and acrylic acid monomers at an amount of no less than 90 weight % of the total monomer weight, said monomers further comprising methacrylic acid.

8. The aqueous ink composition according to claim 5, wherein the acrylate includes benzyl acrylate and/or butyl acrylate.

9. An ink jet recording method comprising the steps of:
preparing, in an ink jet recording type recording device, the aqueous ink composition according to claim 1; and
depositing the aqueous ink composition onto the surface of a recording medium by said ink jet recording type recording device.

10. An ink jet recorded matter having dot patterns that is formed by an ink jet recording method on the surface of a recording medium and comprises the aqueous ink composition according to claim 1.

11. The aqueous ink composition according to claim 8, wherein the acrylate includes butyl acrylate.

* * * * *